(12) United States Patent
Gu et al.

(10) Patent No.: US 12,519,325 B2
(45) Date of Patent: Jan. 6, 2026

(54) ELECTRONIC DEVICE FOR CARRYING OUT OVERVOLTAGE PROTECTION OPERATION AND CONTROL METHOD THEREFOR

(71) Applicant: SAMSUNG ELECTRONICS CO., LTD., Suwon-si (KR)

(72) Inventors: Beomwoo Gu, Suwon-si (KR); Jaeseok Park, Suwon-si (KR); Jaehyun Park, Suwon-si (KR); Jaesun Shin, Suwon-si (KR); Jihyun Yang, Suwon-si (KR); Jeongman Lee, Suwon-si (KR); Seogyong Jeong, Suwon-si (KR); Hyoseok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 17/970,216

(22) Filed: Oct. 20, 2022

(65) Prior Publication Data
US 2023/0040473 A1 Feb. 9, 2023

Related U.S. Application Data

(63) Continuation of application No. PCT/KR2021/004149, filed on Apr. 2, 2021.

(30) Foreign Application Priority Data

Apr. 20, 2020 (KR) .................. 10-2020-0047603
Jul. 6, 2020 (KR) .................. 10-2020-0083064

(51) Int. Cl.
*H02J 7/00* (2006.01)
*H02J 7/34* (2006.01)
(Continued)

(52) U.S. Cl.
CPC ...... *H02J 7/00308* (2020.01); *H02J 7/00712* (2020.01); *H02J 7/345* (2013.01);
(Continued)

(58) Field of Classification Search
CPC ........ H02J 7/00308; H02J 50/80; H02J 50/12; H02J 7/00712; H02J 7/345; H02J 2207/20; H02J 2207/50
(Continued)

(56) References Cited

U.S. PATENT DOCUMENTS 8,928,276 B2 * 1/2015 Kesler ............... H04B 5/79
320/108
8,933,594 B2 * 1/2015 Kurs ............... B60L 53/665
320/108
(Continued)

FOREIGN PATENT DOCUMENTS

JP  05-019754 A  4/1993
JP  2011-172307 A  9/2011
(Continued)

OTHER PUBLICATIONS

Korean Office Action dated Aug. 8, 2024 for KR Application 10-2020-0083064.
(Continued)

*Primary Examiner* — Suresh Memula
(74) *Attorney, Agent, or Firm* — Nixon & Vanderhye P.C.

(57) ABSTRACT

An electronic device may include: a resonance circuit which comprises a battery, a coil and a capacitor, and receives power wirelessly; a rectifier which rectifies AC power, provided from the resonance circuit, to DC power; a DC/DC converter which converts and outputs the DC power provided from the rectifier; a charger which charges the battery by using the converted power provided from the DC/DC converter; a first OVP circuit which selectively connects the
(Continued)

coil to the capacitor; a second OVP circuit which is connected in parallel to the first OVP circuit; a detection circuit which detects a rectified voltage; a control circuit; and a communication circuit, wherein the control circuit, on the basis that the detected rectified voltage is equal to or greater than a first threshold voltage, controls the first OVP circuit so as to be in an off state so that the coil is not connected to the capacitor, and on the basis that the detected rectified voltage is less than a second threshold voltage, controls the first OVP circuit so that the first OVP circuit is switched from the off state to an on state so that the coil is connected to the capacitor, wherein the second threshold voltage may be smaller than the first threshold voltage.

15 Claims, 17 Drawing Sheets

(51) Int. Cl.
*H02J 50/12* (2016.01)
*H02J 50/80* (2016.01)

(52) U.S. Cl.
CPC ............. *H02J 50/12* (2016.02); *H02J 50/80* (2016.02); *H02J 2207/20* (2020.01); *H02J 2207/50* (2020.01)

(58) Field of Classification Search
USPC .......................................................... 320/108
See application file for complete search history.

(56) References Cited

U.S. PATENT DOCUMENTS

| | | | |
|---|---|---|---|
| 10,199,866 B2 * | 2/2019 | Uchimoto | H02J 7/04 |
| 12,341,356 B2 * | 6/2025 | Lee | H02J 50/12 |
| 2011/0084652 A1 * | 4/2011 | Julstrom | H02J 50/12 |
| | | | 320/108 |
| 2011/0115431 A1 | 5/2011 | Dunworth et al. | |
| 2012/0223591 A1 | 9/2012 | Cheon et al. | |
| 2013/0249302 A1 | 9/2013 | An et al. | |
| 2014/0246923 A1 | 9/2014 | Riehl et al. | |
| 2014/0266019 A1 * | 9/2014 | Pigott | H02J 50/80 |
| | | | 320/108 |
| 2014/0333142 A1 | 11/2014 | Desrosiers | |
| 2015/0055972 A1 | 2/2015 | Kosaka | |
| 2016/0254659 A1 * | 9/2016 | Chambon | H02H 3/202 |
| | | | 320/108 |
| 2018/0062445 A1 | 3/2018 | Hwang et al. | |
| 2018/0145543 A1 | 5/2018 | Piasecki | |
| 2019/0013728 A1 | 1/2019 | Liu et al. | |
| 2019/0058323 A1 | 2/2019 | Sohma et al. | |
| 2019/0101575 A1 | 4/2019 | Inukai | |
| 2023/0146055 A1 * | 5/2023 | Park | H02J 50/80 |
| | | | 307/104 |
| 2025/0112503 A1 * | 4/2025 | Kang | H02M 3/01 |

FOREIGN PATENT DOCUMENTS

| | | | | |
|---|---|---|---|---|
| JP | 2015-42118 | A | 3/2015 | |
| JP | 2017-195750 | A | 10/2017 | |
| JP | 2019-30179 | A | 2/2019 | |
| JP | 2019-66304 | A | 4/2019 | |
| KR | 10-2012-0100666 | A | 9/2012 | |
| KR | 10-2012-0103637 | A | 9/2012 | |
| KR | 10-2012-0128099 | A | 11/2012 | |
| KR | 10-2013-0108050 | A | 10/2013 | |
| KR | 10-2013-0120913 | A | 11/2013 | |
| KR | 10-2015-0001416 | A | 1/2015 | |
| KR | 10-2016-0112291 | A | 9/2016 | |
| KR | 10-2017-1946027 | B1 | 2/2019 | |
| KR | 10-2020-0015007 | A | 2/2020 | |
| KR | 20220086241 | A * | 6/2022 | ............. H02J 50/12 |
| WO | WO 2021/215696 | A1 | 10/2021 | |

OTHER PUBLICATIONS

PCT International Search Report dated Jul. 13, 2021 for PCT/KR2021/004149; 3 pgs.
PCT Written Opinion dated Jul. 13, 2021 for PCT/KR2021/004149; 3 pgs.
Translation of PCT International Search Report dated Jul. 13, 2021 for PCT/KR2021/004149; 2 pgs.
Korean Decision on Grant dated Jan. 13, 2025 for KR Application No. 10-2020-0083064.

* cited by examiner

ELECTRONIC DEVICE FOR CARRYING OUT OVERVOLTAGE PROTECTION OPERATION AND CONTROL METHOD THEREFOR

CROSS-REFERENCE TO RELATED APPLICATIONS

This application is a continuation of International Application No. PCT/KR2021/004149, filed Apr. 2, 2021, designating the United States, in the Korean Intellectual Property Receiving Office, and claiming priority to KR Patent Application No. 10-2020-0047603, filed Apr. 20, 2020, and to KR Patent Application No. 10-2020-0083064, filed Jul. 6, 2020, the disclosures of which are all hereby incorporated by reference herein in their entireties.

BACKGROUND

Field

Various example embodiments relate to an electronic device for performing an overvoltage protection operation, and/or a method of controlling the same.

Description of Related Art

Along with the recent development of wireless charging technology, a technique of supplying power to various electronic devices and charging them with the power by a single charging device is under study.

The wireless charging technology relies on wireless power transmission and reception. For example, a battery may be automatically charged simply by placing an electronic device on a charging pad without connecting the electronic device via a charging connector.

The wireless charging technology largely includes an electromagnetic induction scheme using a coil, a resonance scheme based on resonance, and a radio frequency (RF)/micro wave radiation scheme in which electrical energy is converted into micro waves and transmitted.

In a power transmission method based on wireless charging, power is transmitted between a first coil of a transmitter and a second coil of a receiver. A magnetic field is generated at the transmitter, and current is induced or resonated according to a change in the magnetic field at the receiver, thereby generating energy.

The wireless charging technology based on electromagnetic induction or magnetic resonance has recently gained popularity mainly among electronic devices such as smartphones. When a power transmitting unit (PTU) (e.g., a wireless charging pad) and a power receiving unit (PRU) (e.g., a smartphone) come into contact with each other or are located within a specific distance, the battery of the PRU may be charged by electromagnetic induction or electromagnetic resonance between a transmission coil of the PTU and a reception coil of the PRU.

SUMMARY

To receive power even from a remote PTU, an electronic device may use parallel resonance by connecting a reception coil to a capacitor in parallel, for increasing a voltage induced to the reception coil. Compared to series connection between the reception coil and the capacitor, parallel connection between the reception coil and the capacitor may increase wireless power transmission efficiency in an environment with a low coupling coefficient (e.g., a remote environment).

The voltage induced to the reception coil of the electronic device may be different according to the distance to the PTU. For example, when the electronic device is located near to the PTU, a high voltage may be induced to the reception coil. Because the voltage induced to the reception coil increases according to parallel resonance, the induction of the high voltage to the reception coil of the electronic device may cause an overvoltage in an internal circuit (e.g., a load). There may be a need for an overvoltage protection (OVP) operation or a protection operation such as detuning and/or pre-clamping to prevent or reduce the overvoltage in the internal circuit.

To protect the internal circuit from an overvoltage that may occur in the electronic device near to the PTU, a switching device may be considered to separate the internal circuit from parallel resonance of the reception coil and the capacitor. However, when the switching device is used with the parallel resonance maintained, the parallel resonance imposes a current burden on the reception coil, thereby increasing the temperature of the reception coil and/or damaging the reception coil.

According to various example embodiments, there may be provided an electronic device for protecting an internal device from an overvoltage by disconnecting parallel connection between a reception coil and a capacitor, upon occurrence of the overvoltage, and/or a method of operating the same.

According to various example embodiments, there may be provided an electronic device for protecting a switching device from a voltage spike (e.g., a surge voltage) caused by disconnection of parallel connection between a reception coil and a capacitor through the switching device, and/or a method of operating the same.

According to various example embodiments, an electronic device for charging energy using a voltage spike (e.g., a surge voltage) caused by disconnection of parallel connection between a reception coil and a capacitor, and/or a method of operating the same may be provided.

According to various example embodiments, an electronic device may include a battery, a resonance circuit comprising a coil and a capacitor and configured to receive power wirelessly, a rectifier configured to rectify alternating current (AC) power received from the resonance circuit into direct current (DC) power, a DC/DC converter configured to convert the DC power received from the rectifier and output the converted power, a charger configured to charge the battery using the converted power received from the DC/DC converter, a first overvoltage protection (OVP) circuit configured to selectively connect the coil to the capacitor, a second OVP circuit connected in parallel to the first OVP circuit, a sensing circuit configured to sense the rectified voltage of the rectifier, a control circuit, and a communication circuit. The control circuit may be configured to control the first OVP circuit to an off state not to connect the coil to the capacitor, based on the sensed rectified voltage being equal to or greater than a first threshold voltage, and control to switch the first OVP circuit from the off state to an on state to connect the coil to the capacitor, based on the sensed rectified voltage being less than a second threshold voltage. The second threshold voltage may be less than the first threshold voltage.

According to various example embodiments, an electronic device for protecting an internal device from an overvoltage by disconnecting parallel connection between a reception coil and a capacitor, upon occurrence of the overvoltage, and a method of operating the same may be provided. Accordingly, parallel resonance may not be generated between the reception coil and the capacitor, thereby alleviating the current burden of the reception coil.

According to various example embodiments, an electronic device for protecting a switching device from a voltage spike (e.g., a surge voltage) caused by disconnection of parallel connection between a reception coil and a capacitor through the switching device, and a method of operating the same may be provided. Therefore, voltage spike-incurred damage to the switching device may be prevented or reduced.

According to various example embodiments, an electronic device for charging energy using a voltage spike (e.g., a surge voltage) caused by disconnection of parallel connection between a reception coil and a capacitor, and a method of operating the same may be provided. Accordingly, the on/off state of a switching device may be controlled even without separate power for controlling the switching device.

Various effects exerted by the disclosure are not limited to the above-described effects.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1A:
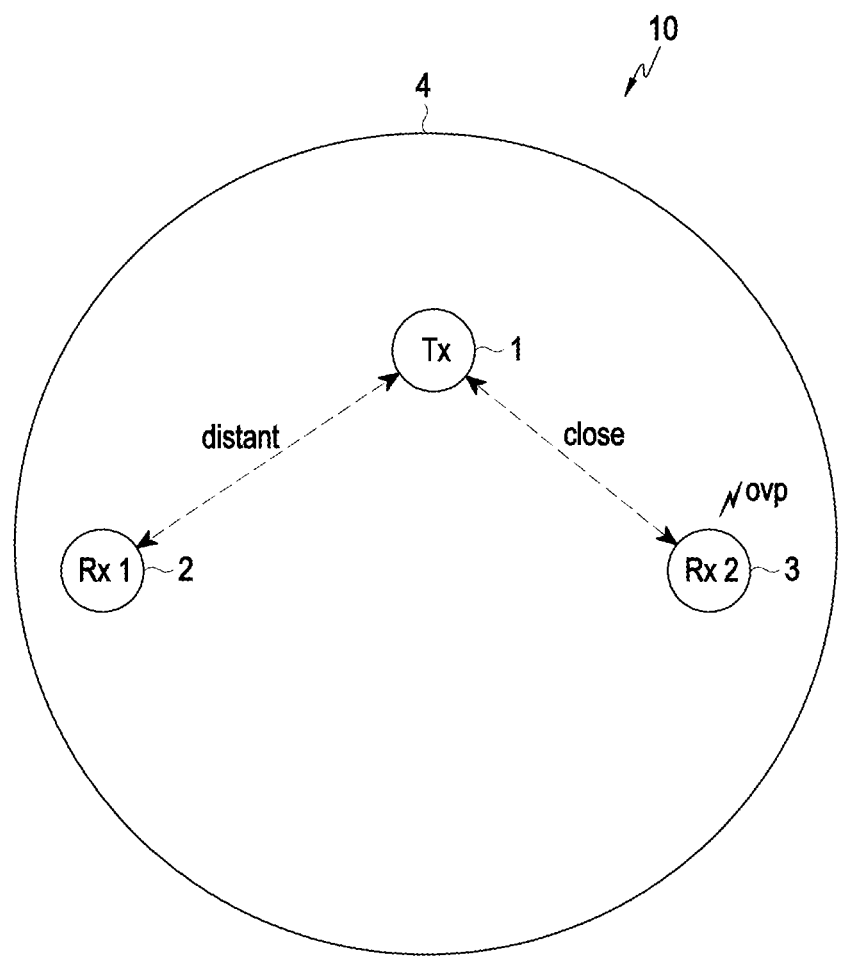
FIG. 1a illustrates a wireless power transmission and reception system according to various example embodiments.

FIG. 1a illustrates a wireless power transmission and reception system 10 according to various embodiments.

According to various embodiments, the wireless power transmission and reception system 10 may include a wireless power transmitter 1. The wireless power transmission and reception system 10 may include at least one electronic device 2 and 3 that wirelessly receives power from the wireless power transmitter 1. The electronic devices 2 and 3 may be referred to as wireless power receivers in that they are capable of receiving power wirelessly.

According to various embodiments, the wireless power transmitter 1 may wirelessly transmit power to the at least one electronic device 2 and 3. The wireless power transmitter 1 may transmit power to the electronic devices 2 and 3 according to various wireless charging schemes.

For example, the wireless power transmitter 1 may transmit power according to a resonance scheme. In the case of the resonance scheme, the wireless power transmitter 1 may include, for example, a power source, a direct current (DC)—alternating current (AC) conversion circuit, an amplification circuit, an impedance matching circuit, at least one capacitor, at least one coil, an out-band communication circuit (e.g., Bluetooth low energy (BLE) communication circuit) and so on. The at least one capacitor and the at least one coil may form a resonance circuit. The wireless power transmitter 1 may be implemented in a manner defined by, for example, the Alliance for Wireless Power (A4WP) standard (or the air fuel alliance (AFA) standard). The wireless power transmitter 1 may include a coil capable of generating an induced magnetic field, when current (e.g., AC) flows according to the resonance scheme or an induction scheme. A process of generating a magnetic field through the coil in the wireless power transmitter 1 may be expressed as wireless power output, and a process of generating an induced electromotive force based on the generated magnetic field in the electronic devices 2 and 3 may be expressed as wireless power reception. It may be said that the wireless power transmitter 1 wirelessly transmits power to the electronic devices 2 and 3 through these processes. In addition, each of the electronic devices 2 and 3 may include a coil in which an induced electromotive force is generated by a magnetic field changing in magnitude over time, formed around the electronic device. As the induced electromotive force is generated in the coils of the electronic devices 2 and 3, a process of outputting AC current from the coils or applying an AC voltage to the coils may be expressed as wireless reception of power in the electronic devices 2 and 3.

In another example, the wireless power transmitter 1 may transmit power according to an electromagnetic wave scheme. In the case of the electromagnetic wave scheme, the wireless power transmitter 1 may include, for example, a power source, a DC-AC conversion circuit, an amplification circuit, a division circuit, a phase shifter, an antenna array for power transmission including a plurality of antennas (e.g., a patch antenna, a dipole antenna, and/or a monopole antenna), an out-band communication circuit (e.g., a BLE communication module). The wireless power transmitter 1 may perform beamforming by adjusting the phase and/or amplitude of an input electrical signal on an antenna basis. The electronic devices 2 and 3 may include antennas capable of outputting current by using RF waves formed around the electronic devices 2 and 3. The process of generating RF waves by the wireless power transmitter 1 may be expressed as wireless power transmission of the wireless power transmitter 1. The process of outputting current from an antenna using RF waves by the electronic devices 2 and 3 may be expressed as wireless power reception of the electronic devices 2 and 3.

For example, the wireless power transmitter 1 may transmit power according to the induction scheme. In the case of the induction scheme, the wireless power transmitter may include, for example, a power source, a DC-AC conversion circuit, an amplification circuit, an impedance matching circuit, at least one capacitor, at least one coil, a communication modulation and demodulation circuit, and so on. The at least one capacitor may form a resonance circuit, together with the at least one coil. The wireless power transmitter 1 may be implemented in a manner defined by, for example, the wireless power consortium (WPC) standard (or Qi standard).

According to various embodiments, the wireless power transmitter 1 may communicate with the electronic devices 2 and 3. For example, the wireless power transmitter 1 may communicate with the electronic devices 2 and 3 according to an in-band scheme. The wireless power transmitter 1 or the electronic devices 2 and 3 may change the load (or impedance) of data to be transmitted, for example, according to an on/off keying modulation scheme. Each of the wireless power transmitter 1 or the electronic devices 2 and 3 may determine data transmitted from the other party by measuring a load change (or an impedance change) based on a change in the magnitude of the current, voltage, or power of a coil. For example, the wireless power transmitter 1 may communicate with the electronic devices 2 and 3 according to an out-band scheme. The wireless power transmitter 1 or the electronic devices 2 and 3 may transmit and receive data using a communication circuit (e.g., a BLE communication module) provided separately from a coil or patch antenna. The wireless power transmitter 1 may transmit media data, and depending on implementation, each of a plurality of different communication circuits (e.g., a BLE communication module, a Wi-fi module, and a Wi-gig module) may transmit or receive media data or a wireless power control signal. Each "module" herein may comprise circuitry.

Referring to FIG. 1*a*, according to various embodiments, the electronic devices 2 and 3 may be located in (or enter) a chargeable area 4 of the wireless power transmitter 1. According to various embodiments, the electronic devices 2 and 3 may wirelessly receive power from the wireless power transmitter 1. According to various embodiments, each of the electronic devices 2 and 3 may process (e.g., rectify and convert (or regulate)) power output by inducing a voltage to the coil included therein, and transmit the processed power to a load (e.g., a battery or a charger for charging the battery) of the electronic device. According to various embodiments, in the case of space wireless charging, a resonance circuit may be configured by connecting a capacitor to a coil in parallel to increase the efficiency of power received wirelessly from the wireless power transmitter 1, thereby increasing a voltage induced to the coil through parallel resonance.

According to various embodiments, each of the electronic devices 2 and 3 may measure a rectified voltage (e.g., a voltage at an output terminal of the rectifier of the electronic device). According to various embodiments, the intensity of the rectified voltages may be proportional to the intensity of the voltage induced to the electronic device by the wireless power transmitter 1. According to various embodiments, a high voltage may be induced to the coil of the electronic device 3 located in a relatively short distance to the wireless power transmitter 1, and thus, the rectified voltage of the electronic device 3 may be measured relatively high.

According to various embodiments, each of the electronic devices 2 and 3 may identify whether the measured rectified voltage exceeds a threshold voltage to determine whether the electronic device is in an overvoltage state. According to various embodiments, when identifying that the measured rectified voltage is equal to or less than the threshold voltage, the electronic device may process power output from the resonance circuit and transmit the processed power to the load of the electronic device, determining that it is not in the overvoltage state (e.g., a safe reception state).

According to various embodiments, when identifying the measured rectified voltage exceeds the threshold voltage, the electronic device 3 may determine that it is in the overvoltage state. According to various embodiments, when determining that the electronic device 3 is in the overvoltage state, the electronic device 3 may perform an overvoltage protection (OVP) operation to protect an internal circuit (e.g., a load) from the rectified voltage exceeding the threshold voltage. For example, the electronic device 3 may bypass current output from the coil to another element (e.g., a switch), so that power output from the resonance circuit is not transferred to the load according to the induced voltage. However, although the electronic device 3 may prevent or reduce charging based on the rectified voltage exceeding the threshold voltage by bypassing the current output from the resonance circuit to another element (e.g., the switch), the other element (e.g., the switch) may be damaged. For example, high current is output from the resonance circuit due to parallel resonance of the resonance circuit. As this high current is bypassed to the above-described other element (e.g., the switch), the other element may be damaged by the excessive current flowing through it. Accordingly, it is difficult to charge the electronic device 3 located in a short distance from the wireless power transmitter 1. Further, even when the electronic device 2 located far from the wireless power transmitter 1 moves to be closer, the same problem may occur. In another example, when identifying the overvoltage state, the electronic device 3 may report the overvoltage state to the wireless power transmitter 1, so that the wireless power transmitter 1 reduces the magnitude of transmission power (e.g., the intensity of an induced magnetic field) to reduce the intensity of a voltage induced in the coil. However, the decrease of the magnitude of the transmission power of the wireless power transmitter 1 may lead to reduction of the chargeable area 4. Accordingly, the electronic device 2 capable of safely receiving power from the wireless power transmitter 1 may fail to perform charging or receive power of a reduced magnitude, resulting in an increase in a full charging time.

According to various embodiments, the electronic device 3 may determine whether the overvoltage state has occurred. When determining that the overvoltage state has occurred, the electronic device 3 may disconnect the parallel connection between the coil and the capacitor of the resonance circuit by using at least one switch. The disconnection may prevent or reduce power received from the wireless power transmitter 1 from being transferred to the load in the overvoltage state. According to various embodiments, the electronic device 3 may use at least one element (e.g., a transient voltage suppressor (TVS) diode or a capacitor) connected to the at least one switch in parallel to protect the at least one switch from a voltage spike (e.g., surge voltage) generated across the at least one switch, when the parallel connection between the coil and the capacitor of the resonance circuit is disconnected.

Figure 1B:
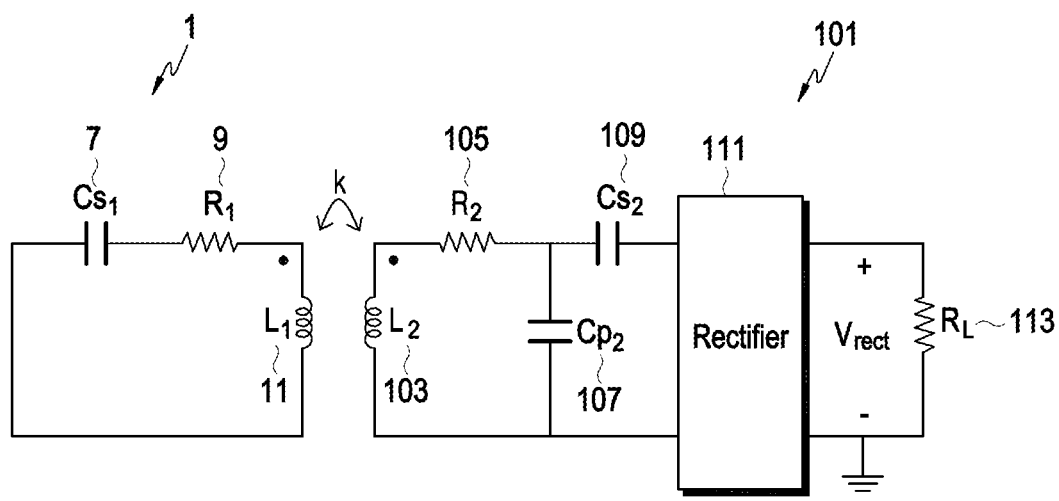
FIG. 1B is an equivalent circuit diagram illustrating a wireless transmission and reception system according to various example embodiments.

FIG. 1B is an equivalent circuit diagram illustrating a wireless transmission and reception system according to various embodiments.

According to various embodiments, the wireless power transmitter 1 may include a power supply, a capacitor 7, a resistor 9, and/or a coil 11. According to various embodiments, the power supply may output AC power, and include a DC/AC converter (or an inverter). According to various embodiments, at least some of the capacitor 7, the resistor 9, and the coil 11 may form a resonance circuit and/or an impedance matching circuit. According to various embodiments, the capacitor 7 may have a capacitance $C_{S1}$, the resistor 9 may have a resistance $C_{S1}$, and the coil 11 may have an inductance $L_1$. According to various embodiments, characteristic values of the capacitor 7, the resistor 9, and the coil 11 may be set in consideration of the resonance frequency and/or impedance matching of the resonance circuit. According to various embodiments, the characteristic value (e.g., $C_{S1}$) of the capacitor 7 may be, but not limited to, for example, a value matched so that the imaginary part of an input impedance in the wireless power transmitter 1 becomes zero. According to various embodiments, at least one element may be implemented as a variable element with a variable characteristic value. It will be understood by those skilled in the art that the connection relationship of the capacitor 7, the resistor 9, or the coil 11 is merely exemplary. According to various embodiments, the wireless power transmitter 1 may further include at least one capacitor (not shown) connected in parallel to the coil 11, and the capacitance of the at least one capacitor (not shown) may be a value matched to satisfy a minimum coupling coefficient and an output power specification of an electronic device in a power amplifier.

According to various embodiments, an electronic device 101 (e.g., the electronic devices 2 and 3 of FIG. 1a) may include a coil 103, a resistor 105, a capacitor 107, a capacitor 109, a rectifier 111, and/or a load 113. According to various embodiments, at least some of the coil 103, the resistor 105, the capacitor 107, the capacitor 109, the rectifier 111, and the load 113 may form a resonance circuit and/or an impedance matching circuit. For example, the coil 103 and the capacitor 107 may form a resonance circuit that receives power from the wireless power transmitter 1. According to various embodiments, the coil 103 may have an inductance $L_2$, the resistor 105 may have a resistance value $R_2$, the capacitor 107 may have a capacitance $C_{P2}$, and the capacitor 109 may have a capacitance $C_{S2}$. According to various embodiments, the characteristic values of the coil 103, the resistor 105, the capacitor 107, and the capacitor 109 may be set in consideration of the resonance frequency and/or impedance matching of the resonance circuit. According to various embodiments, the characteristic value (e.g., $Cs_2$) of the capacitor 107 may be, but not limited to, for example, a value matched such that the imaginary part of an output impedance of the electronic device 101 becomes zero. According to various embodiments, the characteristic value (e.g., $C_{P2}$) of the capacitor 109 may have, but not limited to, for example, a value that makes the real part of the output impedance of the electronic device 101 equal to a load resistance. According to various embodiments, at least one element may be implemented as a variable element with a variable characteristic value. It will be understood by those skilled in the art that the connection relationship of the capacitor(s), resistor(s), and/or coil(s) is merely exemplary.

According to various embodiments, a mutual inductance based on a self-coupling coefficient κ may be formed between the wireless power transmitter 1 and the electronic device 101. According to various embodiments, the magnetic coupling coefficient κ may vary according to the distance between the wireless power transmitter 1 and the electronic device 101. For example, as the electronic device 101 is closer to the wireless power transmitter 1, the magnetic coupling coefficient κ may be greater. According to various embodiments, as power reception from the wireless power transmitter 1 proceeds, a voltage (hereinafter, a rectified voltage) (e.g., $V_{rect}$) at the output terminal of the rectifier 111 may gradually increase. According to various embodiments, a maximum or high voltage to which the rectified voltage (e.g., $V_{rect}$) increases may be different according to the self-coupling coefficient κ. For example, as the self-coupling coefficient κ increases, the rectified voltage (e.g., $V_{rect}$) may increase to a higher voltage. Accordingly, as the distance between the wireless power transmitter 1 and the electronic device 101 is smaller, the rectified voltage (e.g., $V_{rect}$) may increase to a higher voltage, thereby causing an overvoltage state in the electronic device 101.

Figure 2A:
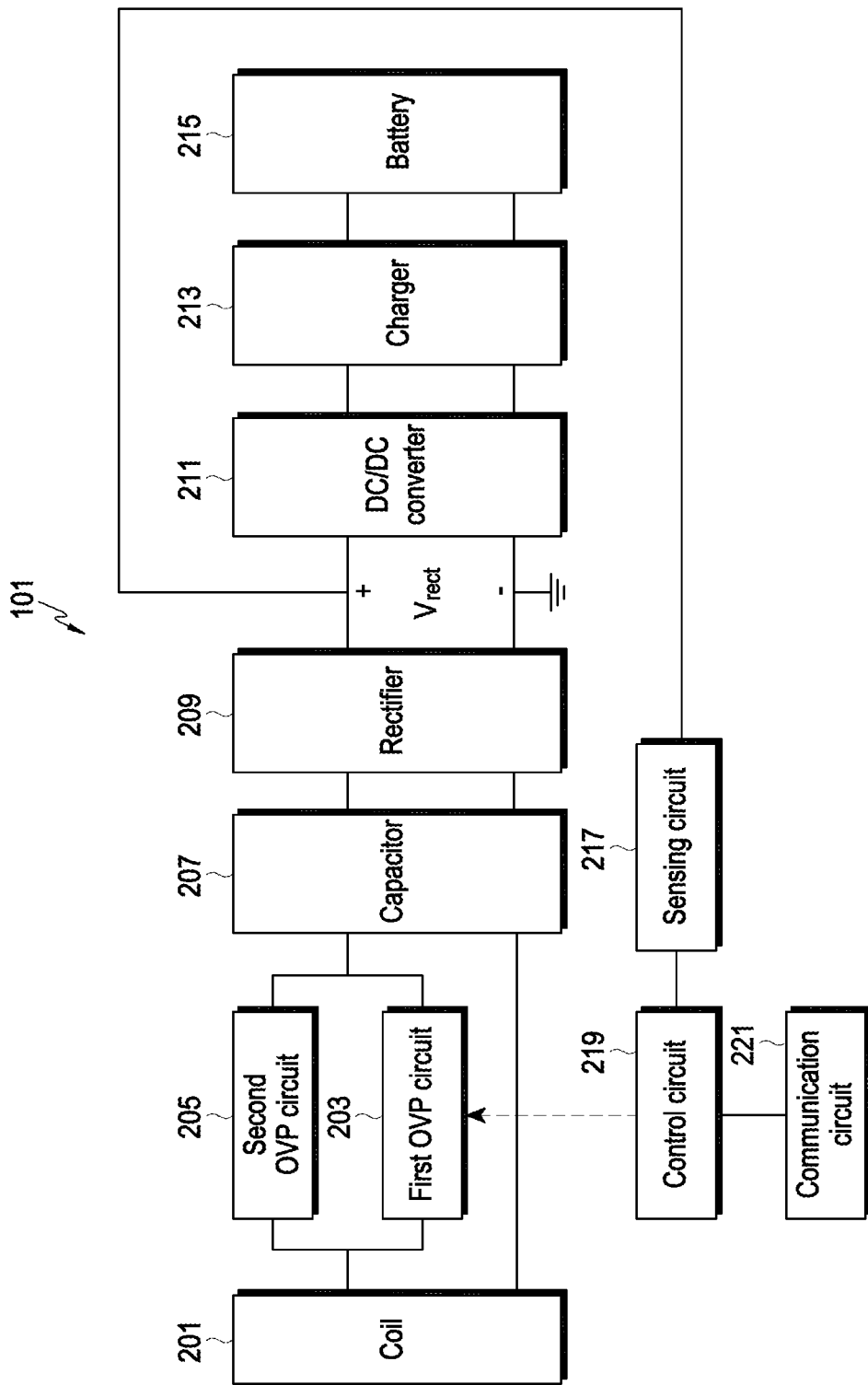
FIG. 2a is a block diagram illustrating an electronic device according to various example embodiments.

FIG. 2a is a block diagram illustrating the electronic device 101 (e.g., the electronic devices 2 and 3 of FIG. 1a) according to various embodiments.

According to various embodiments, the electronic device 101 may include a coil 201 (e.g., the coil 103 of FIG. 1B), a first OVP circuit 203, a second OVP circuit 205, and a capacitor 207 (e.g., the capacitor 107 of FIG. 1B), a rectifier 209 (e.g., the rectifier 111 of FIG. 1B), a DC/DC converter 211, a charger 213, a battery 215, a sensing circuit 217, a control circuit 219, and/or a communication circuit 221.

According to various embodiments, an induced electromotive force may be generated in the coil 201 based on a magnetic field and/or an electric field formed by a wireless power transmitter (e.g., the wireless power transmitter 1 of FIG. 1a), and this may be referred to as wireless power reception. According to various embodiments, AC power may be generated from the coil 201 and transmitted to the first OVP circuit 203 and/or the second OVP circuit 205. According to various embodiments, the coil 201 and the capacitor 207 may be connected to each other in parallel through the first OVP circuit 203, forming a parallel resonance circuit for receiving power from the wireless power transmitter 1. According to various embodiments, the coil 201 may be implemented as one or more coils, and the number of coils is not limited.

According to various embodiments, the first OVP circuit 203 may be located between the coil 201 and the capacitor 207 to selectively connect the coil 201 to the capacitor 207. For example, the first OVP circuit 203 may be connected in series to the coil 201. According to various embodiments, the electronic device 101 may perform a first OVP operation using the first OVP circuit 203 based on a rectified voltage (e.g., $V_{rect}$) applied to the output terminal of the rectifier 209 to protect an internal circuit (e.g., a load) of the electronic device 101. For example, based on the rectified voltage (e.g., $V_{rect}$) applied to the output terminal of the rectifier 209 being equal to or greater than (or exceeding) a first threshold voltage, the first OVP circuit 203 may be switched to an off state, and thus disconnect the parallel connection between the coil 201 and the capacitor 207 of the resonance circuit. For example, based on the rectified voltage (e.g., $V_{rect}$) applied to the output terminal of the rectifier 209 being less than (or less than or equal to) a second threshold voltage, the first OVP circuit 203 may be switched to an on state, and thus connect the coil 201 and the capacitor 207 of the resonance circuit to each other in parallel. According to various embodiments, the on/off state of the first OVP circuit 203 may be controlled by the control circuit 219. According to various embodiments, the first OVP circuit 203 may include at least one switch (e.g., a bi-directional switch) for selectively connecting the coil 201 to the capacitor 207, which will be described in more detail with reference to the later-described drawings. "Circuit" may refer to a component including at least one element, such as the above-described bi-directional switch. According to various embodiments, the first OVP circuit 203 may include at least one solid state relay (SSR). For example, as the SSR may include an opto-coupler composed of a light emitting diode (LED) and a photodiode, the on/off state of the SSR may be controlled depending on whether current flows to the LED. For example, when current flows through the LED, light is radiated from the LED, and when the radiated light reaches the photodiode, the photodiode may be controlled to the on state, thereby turning on the at least one SSR. For example, when no current flows through the LED, light is not radiated from the LED, and the photodiode is controlled to the off state, so that the at least one SSR may be turned off.

According to various embodiments, the second OVP circuit 205 may be connected in parallel to the first OVP circuit 203. According to various embodiments, the electronic device 101 may perform a second OVP operation for protecting the first OVP circuit 203, using the second OVP circuit 205, so that a voltage across the first OVP circuit 203 does not exceed a predetermined voltage. For example, when the first OVP circuit 203 is switched from the on state to the off state, the parallel connection between the coil 201 and the capacitor 207 of the resonance circuit is disconnected. Therefore, a voltage spike (e.g., surge voltage) may be generated at both ends of the first OVP circuit 203. Upon generation of the voltage spike (e.g., the voltage), the second OVP circuit 205 may perform the second OVP operation to protect the first OVP circuit 203 by attenuating (in other words, clamping) the voltage spike (e.g., surge voltage). When the second OVP circuit 205 performs the second OCP operation, this may indicate, for example, that the second OVP circuit 205 actively performs a corresponding operation, and even though not performing a specific active operation, the second OVP circuit 205 drops the voltage. According to various embodiments, the second OVP circuit 205 may include two or more TVS diodes or at least one capacitor to perform the second OVP operation on an AC voltage applied to both ends of the first OVP circuit 203, which will be described in more detail with reference to the later-described drawings.

According to various embodiments, the capacitor 207 may be connected in parallel to the coil 201 through the first OVP circuit 203. According to various embodiments, the capacitor 207 may be connected in parallel to the coil 201, and thus generate parallel resonance in the resonance circuit including the coil 201 and the capacitor 207. According to various embodiments, the capacitor 207 may allow a high voltage to be applied to at least one capacitor (e.g., the capacitor 109 of FIG. 1B) connected in parallel to the capacitor 207. According to various embodiments, the capacitor 207 may be implemented as one or more capacitors, and the number of capacitors is not limited.

According to various embodiments, the rectifier 209 may rectify AC power received from the resonance circuit (e.g., the capacitor 207) into DC power. According to various embodiments, the rectified voltage (e.g., $V_{rect}$) applied to the output terminal of the rectifier 209 may be sensed to determine whether the electronic device 101 is in the overvoltage state. However, the output terminal of the rectifier 209 is merely exemplary, and a point at which overvoltage determination is made is not limited. According to various embodiments, the rectifier 209 may include a bridge circuit (e.g., a full-bridge circuit or a half-bridge circuit). According to various embodiments, the rectifier 209 may be controlled by the control circuit 219. For example, when the rectifier is implemented as a bridge circuit, the on/off state of an element (e.g., a switch or a transistor) of the bridge circuit may be controlled by the control circuit 219.

According to various embodiments, the DC/DC converter 211 may convert or regulate the rectified voltage received from the rectifier 209. According to various embodiments, the DC/DC converter 211 may supply power having a substantially constant voltage. According to various embodiments, the DC/DC converter 211 may not be included in the electronic device 101 depending on implementation. In an embodiment in which the DC/DC converter 211 is not included, the expression "provided to the DC/DC converter 211" described may be understood as an expression "provided to the charger 213", and "received from the DC/DC converter 211" may be understood as "received from the rectifier 209". According to various embodiments, the DC/DC converter 211 may be connected to a power management integrated circuit (PMIC) for supplying power to at least one hardware component in addition to the charger, and the at least one hardware component (or PMIC) may operate using power from the DC/DC converter 211. According to various embodiments, each of the at least one hardware component may be connected to an individual PMIC, and operate using power received from the PMIC. According to various embodiments, the DC/DC converter 211 may be implemented as one or more DC/DC converters, and the number of DC/DC converters is not limited.

According to various embodiments, the charger 213 may receive power from the DC/DC converter 211 and charge the battery 215 connected to the charger 213 with the received power. According to various embodiments, the charger 213 may control current and/or a voltage applied to the battery 215 based on various charging modes (e.g., a constant current (CC) mode, a constant voltage (CV) mode, or a fast charging mode). For example, the charger 213 may control the current and/or voltage applied to the battery 215 based on a charging state of the battery 215. For example, the charger 213 may control the current and/or voltage applied to the battery 215 based on a user input. For example, when the fast charging mode is selected according to a user input, the charger may control the current and/or voltage according to a setting corresponding to the fast charging mode. According to various embodiments, the type of the battery 215 is not limited, as long as it is a rechargeable secondary cell.

According to various embodiments, the sensing circuit 217 may sense the rectified voltage (e.g., $V_{rect}$) applied to the output terminal of the rectifier 209. According to various embodiments, the sensing circuit 217 may transmit the rectified voltage (e.g., $V_{rect}$) applied to the output terminal of the rectifier 209 to the control circuit 219. For example, the sensing circuit 217 may be implemented as a sensor for sensing the rectified voltage (e.g., $V_{rect}$) applied to the output terminal of the rectifier 209. According to various embodiments, the sensing circuit 217 may transmit a voltage (e.g., $V_{rect\_s}$) corresponding to the rectified voltage (e.g., $V_{rect}$) to the control circuit 219. In this case, the sensing circuit 217 may be implemented as a voltage divider including at least one resistor to transmit the voltage (e.g., $V_{rect\_s}$) corresponding to the rectified voltage (e.g., $V_{rect\_s}$) to the control circuit 219. According to various embodiments, the sensing circuit 217 may be included in the control circuit 219. Sensing the rectified voltage (e.g., $V_{rect\_s}$) or the voltage (e.g., $V_{rect\_s}$) corresponding to the rectified voltage $V_{rect\_s}$ by the sensing circuit 217 may indicate applying (or transmitting) the rectified voltage (e.g., $V_{rect\_s}$) or the voltage (e.g., $V_{rect\_s}$) corresponding to the rectified voltage (e.g., $V_{rect\_s}$) to another element by the sensing circuit 217 as well as measuring the rectified voltage (e.g., $V_{rect\_s}$) or the voltage (e.g., $V_{rect\_s}$) corresponding to the rectified voltage $V_{rect\_s}$) and transmitting the measured voltage to the other element.

According to various embodiments, the control circuit 219 may perform a control operation not to apply an overvoltage to the electronic device 101. For example, the control circuit 219 may perform a control operation such that the rectified voltage (e.g., $V_{rect\_s}$) applied to the output terminal of the rectifier 209 is maintained below the first threshold voltage. However, the output terminal of the rectifier 209 is taken as a mere example. According to various embodiments, the control circuit 219 may control the first OVP operation by hysteresis control based on the voltage (e.g., the rectified voltage (e.g., $V_{rect\_s}$) or the voltage (e.g., $V_{rect\_s}$) corresponding to the rectified voltage (e.g., $V_{rect\_s}$)) received from the sensing circuit 217. For example, the control circuit 219 may control the first OVP circuit 203 to perform the first OVP operation based on the rectified voltage (e.g., $V_{rect\_s}$) applied to the output terminal of the rectifier 209 being equal to or greater than (or exceeding) the first threshold voltage, and control the first OVP circuit 203 to stop the first OVP operation based on the rectified voltage (e.g., $V_{rect\_s}$) applied to the output terminal of the rectifier 209 being less than (or less than or equal to) the first threshold voltage, which will be described in more detail with reference to the later-described drawings.

According to various embodiments, the control circuit 219 may include a comparator that may compare the rectified voltage (e.g., $V_{rect}$) applied to the output terminal of the rectifier 209 with each of the first threshold voltage and/or the second threshold voltage, which will be described in more detail with reference to the later-described drawings.

According to various embodiments, the control circuit 219 may be implemented as, but not limited to, a microprocessor or a micro controlling unit (MCU). Alternatively, the control circuit 219 may include an analog element and output a signal for controlling the on/off state of the first OVP circuit 203 based on an electrical signal from the sensing circuit 217. Alternatively, an analog element that may output a signal for controlling the on/off state of the first OVP circuit 203 may be included in the electronic device 101, separately from the control circuit 219. This may indicate that the first OVP operation is performed by the analog element. According to various embodiments, the control circuit 219 may control the first OVP circuit 203 to perform/stop the first OVP operation having a hysteresis characteristic by comparing, in software, the rectified voltage (e.g., $V_{rect}$) sensed by the sensing circuit 217 with each of the first threshold voltage and/or the second threshold voltage.

According to various embodiments, the control circuit 219 may control the communication circuit 221 to report the overvoltage state to the wireless power transmitter 1. According to various embodiments, when identifying that the rectified voltage (e.g., $V_{rect}$) applied to the output terminal of the rectifier 209 is equal to or greater than (or exceeds) the first threshold voltage, the control circuit 219 may request the wireless power transmitter 1 to reduce the magnitude of transmitted power (or the intensity of an inducted magnetic field) or stop the power transmission by reporting occurrence of the overvoltage state to the wireless power transmitter 1. According to various embodiments, when identifying that the rectified voltage (e.g., $V_{rect}$) applied to the output terminal of the rectifier 209 is less than (or equal to or less than) the first threshold voltage or when identifying that the rectified voltage (e.g., $V_{rect}$) applied to the output terminal of the rectifier 209 is less than (or equal to or less than) the second threshold voltage, the control circuit 219 may request the wireless power transmitter 1 to increase the magnitude of transmitted power (or the intensity of the inducted magnetic field) or maintain the power transmission by reporting non-occurrence of the overvoltage state to the wireless power transmitter 1.

According to various embodiments, the communication circuit 221 may be implemented as, for example, a BLE communication circuit. However, as long as it is a circuit capable of transmitting and receiving a communication signal, the communication scheme in which the communication circuit 221 operates is not limited.

According to various embodiments, the electronic device 101 may further include a load switch (not shown) that selectively connects the DC/DC converter 211 to the charger 213. According to various embodiments, the load switch (not shown) may be located between the DC/DC converter 211 and the charger 213. According to various embodiments, when the load switch (not shown) is in the on state, power converted by the DC/DC converter 211 may be provided to the charger 213. According to various embodiments, when the load switch (not shown) is in the off state, power may not be provided from the DC/DC converter 211 to the charger 213. According to various embodiments, the on/off state of the load switch (not shown) may be controlled by the control circuit 219. For example, when the electronic device 101 enters the chargeable area 4 of the wireless power transmitter 1, the load switch (not shown) may be in the off state. When starting and performing charging, the control circuit 219 may control the load switch (not shown) to the on state so that power from the DC/DC converter 211 is transferred to the charger 213.

Figure 2B:
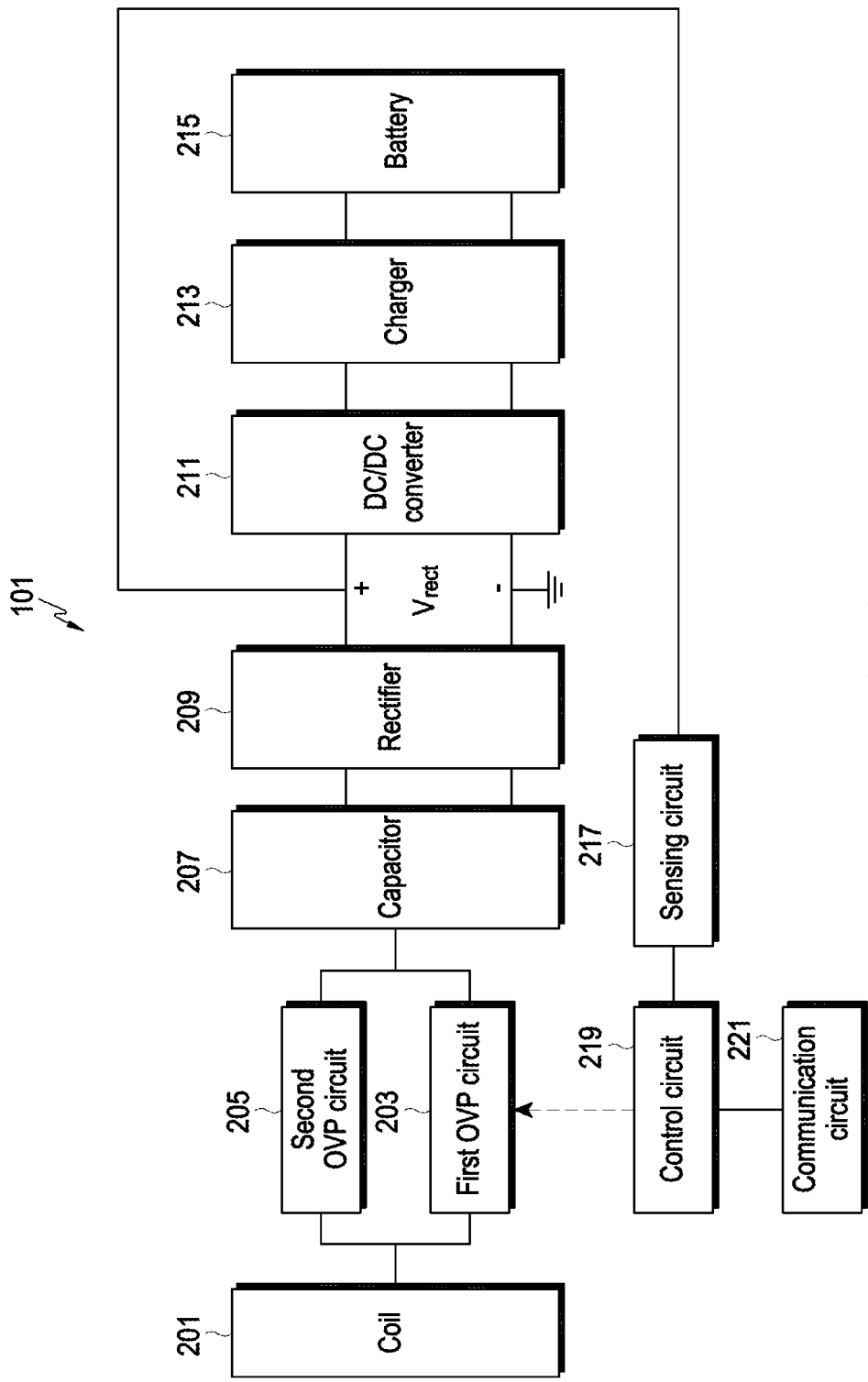
FIG. 2b is a block diagram illustrating an electronic device according to various example embodiments.

FIG. 2b is a block diagram illustrating the electronic device 101 (e.g., the electronic devices 2 and 3 of FIG. 1a) according to various embodiments. Referring to FIG. 2a together, the electronic device 101 of FIG. 2b differs only in that the coil 201 and the capacitor 207 may be connected in series through the first OVP circuit 203, and thus a redundant description is avoided.

According to various embodiments, the coil 201 may be connected in series to the capacitor 207 through the first OVP circuit 203, forming a resonance circuit that receives power from a wireless power transmitter (e.g., the wireless power transmitter 1 of FIG. 1a).

According to various embodiments, the first OVP circuit 203 may be located between the coil 201 and the capacitor 207 to selectively connect, directly or indirectly, the coil 201 to the capacitor 207. For example, the first OVP circuit 203 may be connected in series to the coil 201 and the capacitor 207. According to various embodiments, the electronic device 101 may perform the first OVP operation using the first OVP circuit 203 based on a rectified voltage (e.g., $V_{rect}$) applied to the output terminal of the rectifier 209, to protect an internal circuit (e.g., load). For example, based on the rectified voltage (e.g., $V_{rect}$) applied to the output terminal of the rectifier 209 being equal to or greater than (or exceeding) the first threshold voltage, the first OVP circuit 203 may be switched to the off state, thereby disconnecting the series connection between the coil 201 and the capacitor 207 of the resonance circuit. For example, based on the rectified voltage (e.g., $V_{rect}$) applied to the output terminal of the rectifier 209 being less than (or equal to or less than) the second threshold voltage, the first OVP circuit 203 may be switched to the on state, thereby connecting the coil 201 and the capacitor 207 of the resonance circuit in series. According to various embodiments, the on/off state of the first OVP circuit 203 may be controlled by the control circuit 219. As described above, when the rectified voltage (e.g., $V_{rect}$) is equal to or greater than (or exceeds) the first threshold voltage, the control circuit 219 may control the first OVP circuit 203 to the off state, so that an overvoltage does not flow in at least one element (e.g., at least one switch included in the bridge circuit) included in the rectifier 209 and/or the coil 201. Because this operation limits a temperature increase caused by current flowing in the rectifier 209 and/or the coil 201, the problem that the rectifier 209 and/or the coil 201 is damaged due to a temperature increase may be solved. According to various embodiments, the first OVP circuit 203 may perform an operation of a load switch (not shown) (e.g., the load switch (not shown) of FIG. 2a). For example, when the electronic device 101 enters a chargeable area (e.g., the chargeable area 4 of FIG. 1a) of the wireless power transmitter (e.g., the wireless power transmitter 1 of FIG. 1a), the first OVP circuit 203 may be in the off state. When starting and performing charging, the control circuit 219 may control the first OVP circuit 203 to the on state so that AC power generated in the coil 201 is transferred to the capacitor 207.

Figure 5A:
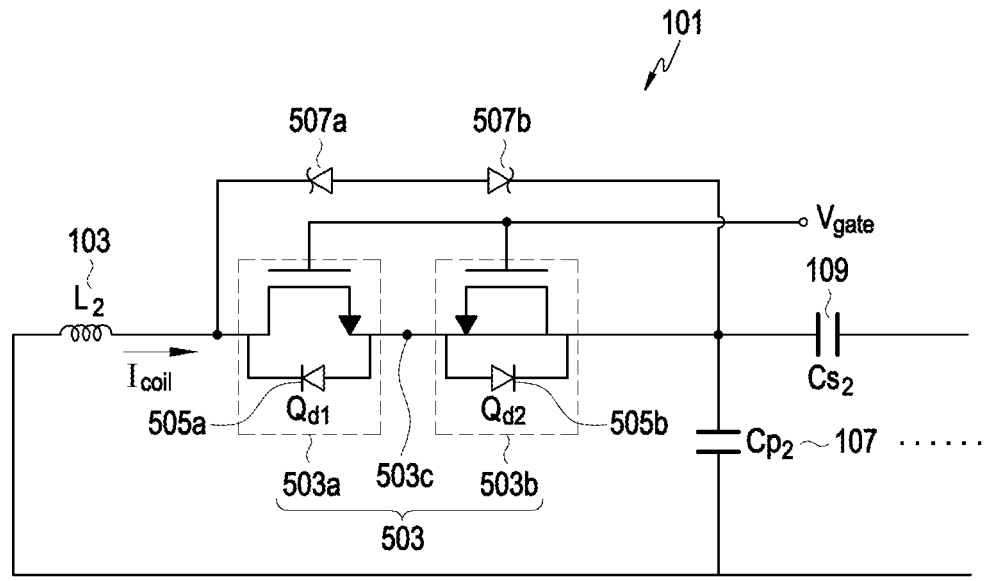
FIG. 5a illustrates an exemplary first OVP circuit and an exemplary second OVP circuit according to various example embodiments.

According to various embodiments, the capacitor 207 may be connected in parallel to the coil 201 through the first OVP circuit 203. According to various embodiments, the capacitor 207 may be connected in parallel to the coil 201 to generate series resonance in the resonance circuit including the coil 201 and the capacitor 207. According to various embodiments, the capacitor 207 may be implemented as one or more capacitors, and the number of capacitors is not limited. Referring to FIG. 5a together, the capacitor 207 may be the capacitor 109. For example, in an embodiment in which the capacitor 207 together with the coil 201 of FIG. 2B forms a series resonance circuit, the capacitor 207 may be the capacitor 109 of FIG. 5a, and the capacitor 107 of FIG. 5a may be omitted.

Figure 3:
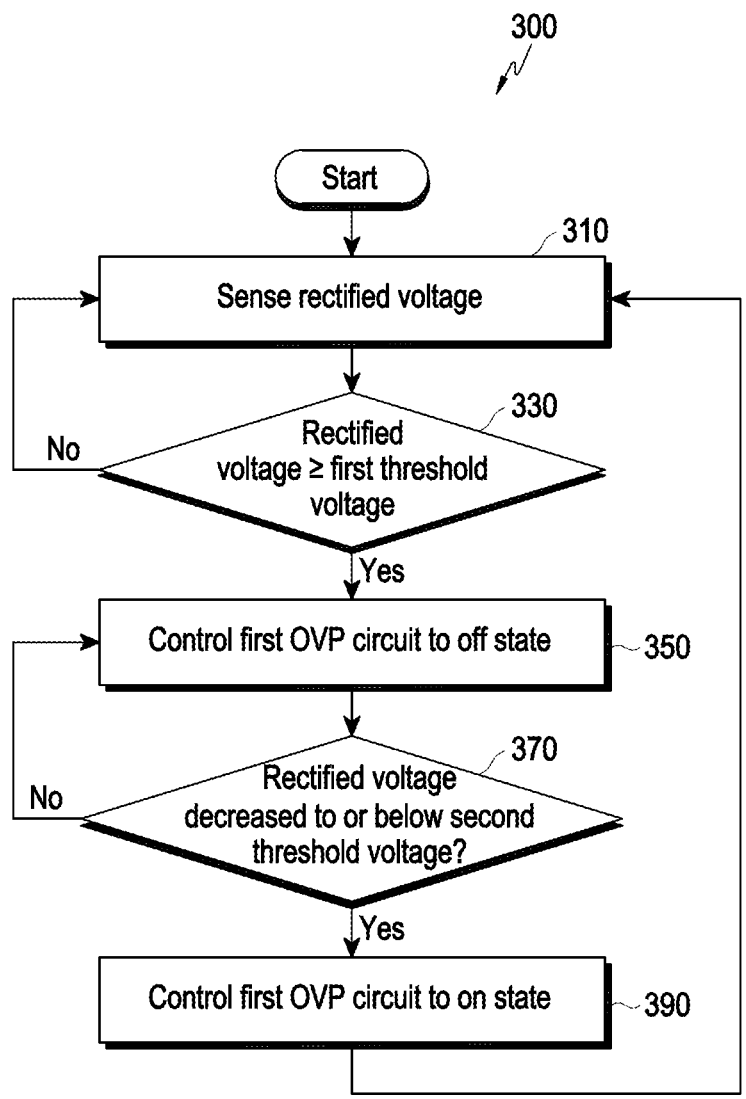
FIG. 3 is a flowchart illustrating a first overvoltage protection (OVP) operation of an electronic device according to various example embodiments.
Figure 4:
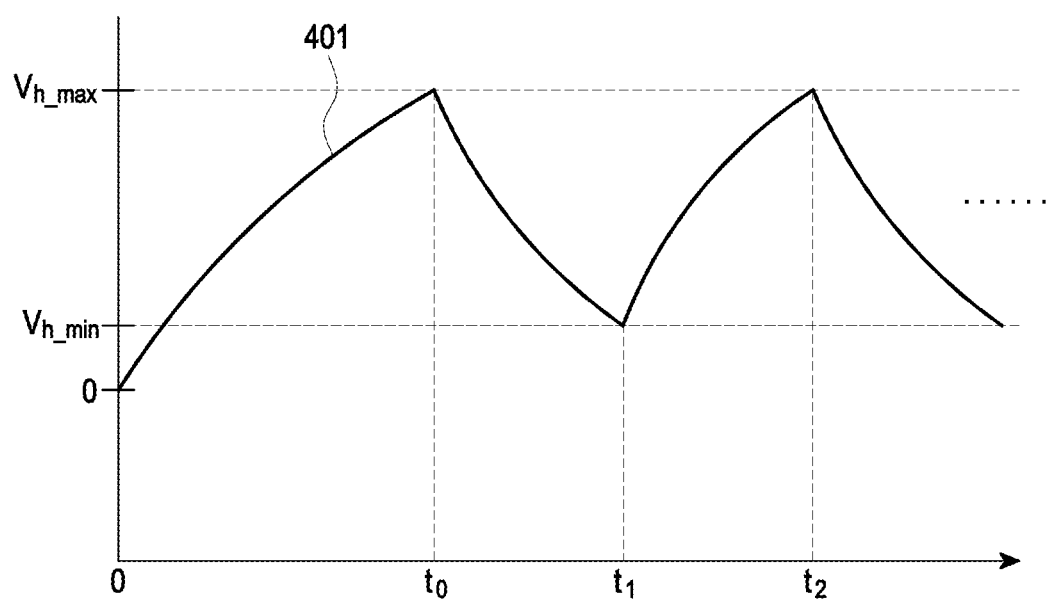
FIG. 4 is an exemplary diagram illustrating a rectified voltage controlled to have a hysteresis characteristic by an electronic device according to various example embodiments.

FIG. 3 is a flowchart 300 illustrating a first OVP operation of an electronic device (e.g., the electronic device 101 of FIG. 2a) according to various embodiments. FIG. 4 is an exemplary diagram illustrating a rectified voltage 401 controlled to have a hysteresis characteristic by the electronic device 101 according to various embodiments.

According to various embodiments, the electronic device 101 may sense a rectified voltage (e.g., the rectified voltage $V_{rect}$ of FIG. 2a) in operation 310.

According to various embodiments, the electronic device 101 may identify whether the rectified voltage (e.g., the rectified voltage $V_{rect}$ of FIG. 2a) is equal to or greater than a first threshold voltage (e.g., the first threshold voltage of FIG. 2a) in operation 330. For example, the first threshold voltage may be $V_{h\_max}$ in FIG. 4. According to various embodiments, the electronic device 101 may identify whether the rectified voltage (e.g., the rectified voltage $V_{rect}$ of FIG. 2a) is equal to or greater than the first threshold voltage (e.g., $V_{h\_max}$ in FIG. 4) by identifying whether a voltage (e.g., $V_{rect\_s}$) corresponding to the rectified voltage (e.g., the rectified voltage $V_{rect}$ of FIG. 2a) is equal to or greater than a first threshold corresponding to the first threshold voltage, which will be described in more detail with reference to the later-described drawings. According to various embodiments, when the rectified voltage (e.g., the rectified voltage $V_{rect}$ of FIG. 2a) is not equal to or greater than (e.g., less than) the first threshold voltage (e.g., $V_{h\_max}$ of FIG. 4), the electronic device 101 may perform operation 310.

According to various embodiments, when the rectified voltage (e.g., the rectified voltage $V_{rect}$ of FIG. 2a) is equal to or greater than the first threshold voltage (e.g., $V_{h\_max}$ of FIG. 4), the electronic device 101 may control the first OVP circuit (e.g., the first OVP circuit 203 of FIG. 2a) to the off state in operation 350. For example, referring to FIG. 4 together, when the electronic device 101 is disposed in a chargeable area (e.g., the chargeable area 4 of FIG. 1a) of a wireless power transmitter (e.g., the wireless power transmitter 1 of FIG. 1a), the rectified voltage 401 may increase to reach the first threshold voltage $V_{h\_max}$ at time to. A control circuit (e.g., the control circuit 219 of FIG. 2a) may control the first OVP circuit 203 to perform the first OVP operation based on a rectified voltage 401 being equal to or greater than (or exceeding) the first threshold voltage $V_{h\_max}$. For example, the control circuit 219 may control the first OVP circuit 203 to the off state. According to various embodiments, as the first OVP operation is performed, the rectified voltage 401 may decrease.

According to various embodiments, in operation 370, the electronic device 101 may identify whether the rectified voltage (e.g., the rectified voltage $V_{rect}$ of FIG. 2a) decreases below a second threshold voltage (e.g., the second threshold voltage of FIG. 2a). For example, the second threshold voltage may be $V_{h\_min}$ of FIG. 4. According to various embodiments, the electronic device 101 may identify whether the rectified voltage (e.g., the rectified voltage $V_{rect}$ of FIG. 2a) is less than the second threshold voltage (e.g., $V_{h\_min}$ of FIG. 4) by identifying whether the voltage (e.g., $V_{rect\_s}$) corresponding to the rectified voltage (e.g., the rectified voltage $V_{rect}$ of FIG. 2a) is less than a second threshold corresponding to the second threshold voltage, which will be described in more detail with reference to the later-described drawings. According to various embodiments, when the rectified voltage (e.g., the rectified voltage $V_{rect}$ of FIG. 2a) is not less than (e.g., equal to or greater than) the second threshold voltage (e.g., $V_{h\_min}$ of FIG. 4), the electronic device 101 may perform operation 350. For example, when the rectified voltage (e.g., the rectified voltage $V_{rect}$ of FIG. 2a) is not less than the second threshold voltage (e.g., $V_{h\_min}$ of FIG. 4), the control circuit 211 may control the first OVP circuit 203 to be kept in the off state.

According to various embodiments, when the rectified voltage (e.g., the rectified voltage $V_{rect}$ of FIG. 2a) decreases below the second threshold voltage (e.g., the second threshold voltage of FIG. 2a), the electronic device 101 may control the first OVP circuit 203 to the on state in operation 390. For example, referring to FIG. 4 together, as the first OVP operation is performed, the rectified voltage 401 may decrease to reach the second threshold voltage $V_{h\_min}$ at time $t_1$. The control circuit 219 may control the first OVP circuit 203 to stop the first OVP operation based on the rectified voltage being less than (or equal to or less than) the second threshold voltage $V_{h\_min}$. For example, the control circuit 219 may switch the first OVP circuit 203 from the off state to the on state. According to various embodiments, as the first OVP operation is stopped, the rectified voltage 401 may increase again to reach the first threshold voltage $V_{h\_max}$ at time $t_2$. According to various embodiments, the electronic device 101 may control the first OVP circuit 203 to the on state, and then sense the rectified voltage 401. When the rectified voltage 401 increases to or above the first threshold voltage $V_{h\_max}$, the electronic device 101 may perform operation 330 and the subsequent operations again. According to various embodiments, the control circuit 219 may repeatedly control execution/discontinuation of the first OVP operation having a hysteresis characteristic, as described above.

Figure 5B:
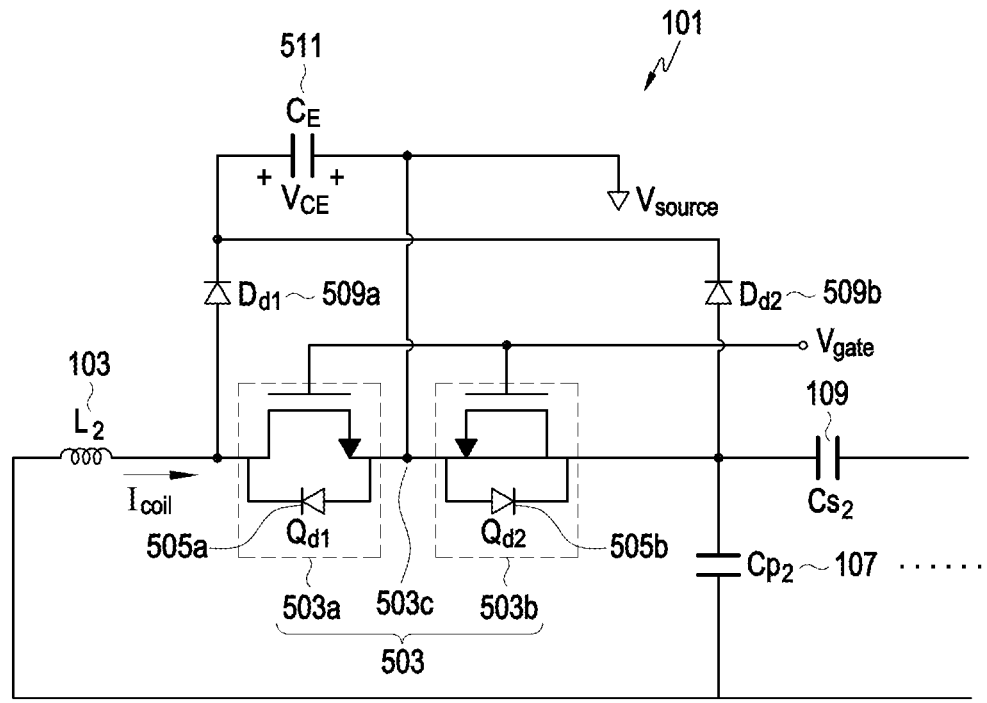
FIG. 5b illustrates another exemplary second OVP circuit according to various example embodiments.
Figure 5C:
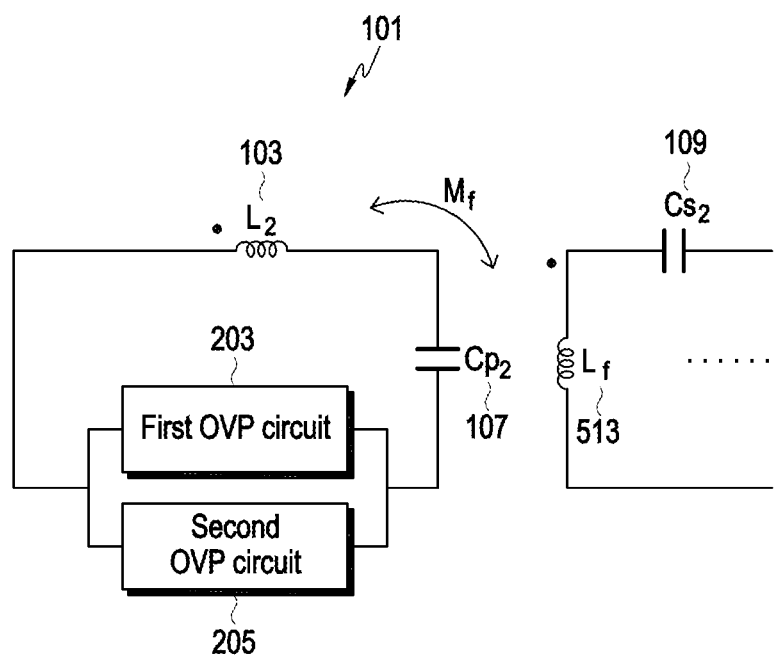
FIG. 5c illustrates another exemplary arrangement of a first OVP circuit and a second OVP circuit according to various example embodiments.

FIG. 5a illustrates an example of a first OVP circuit (e.g., the first OVP circuit 203 of FIG. 2a) and a second OVP circuit (e.g., the second OVP circuit 205 of FIG. 2a) according to various embodiments. FIG. 5b illustrates another example of the second OVP circuit 205 according to various embodiments. FIG. 5c illustrates another example of arrangement of the first OVP circuit 203 and the second OVP circuit 205 according to various embodiments. The following description is given with reference to FIG. 1B and/or FIG. 2a together.

According to various embodiments, an induced electromotive force (e.g., an induced voltage $V_{ind}$) may be generated in the coil $L_2$ 103 (e.g., the coil 201 of FIG. 2a) of the electronic device 101 by mutual inductance formed between the electronic device 101 and a wireless power transmitter (e.g., the wireless power transmitter 1 of FIG. 1a). According to various embodiments, AC current (e.g., a coil current $I_{coil}$) may be output from the coil 103 according to the induced voltage $V_{ind}$. According to various embodiments, while the first OVP circuit 203 is in the on state, the coil 103 and the capacitor $C_{P2}$ 107 (e.g., the capacitor 207 in FIG. 2a) may be connected in parallel to each other, thereby forming a resonance circuit. According to various embodiments, due to the formation of the resonance circuit, a voltage (e.g., a voltage across the capacitor 107) higher than the induced voltage $V_{ind}$ by a quality factor (Q factor) of the resonance circuit may be applied to the capacitor $C_{S2}$ 109.

Referring to FIG. 5a, according to various embodiments, the first OVP circuit 203 may include a bi-directional switch 503 for selectively connecting the coil 103 to the capacitor 107. According to various embodiments, the bi-directional switch 503 may include two or more switches (e.g., a first switch $Q_{d1}$ 503a and a second switch $Q_{d2}$ 503b). For example, each of the first and second switches 503a and 503b may be implemented as metal-oxide semiconductor field-effect transistors (MOSFETs), and as long as it may be switched to the on state or the off state by a control circuit (e.g., the control circuit 219 of FIG. 2a), any switch element is available. According to various embodiments, each of the first and second switches 503a and 503b may be an N-channel MOSFET, and a first diode 505a and a second diode 505b may be body diodes of the first switch 503a and the second switch 503b, respectively. According to various embodiments, as sources of the first switch 503a and the second switch 503b are connected in series at a first end 503c, the first switch 503a and the second switch 503b may have a common source voltage. Unlike the drawing, the first and second switches 503a and 503b may be arranged with their drains connected in series so that the first and second switches 503a and 503b have a common drain voltage. Unlike the drawing, the first and second switches 503a and 503b may be implemented as P-channel MOSFETs in which their sources are connected in series so that the first and second switches 503a and 503b have a common source voltage. According to various embodiments, a common gate voltage $V_{gate}$ for which a common source voltage $V_{source}$ serves as a reference voltage may be applied to each of gates of the first and second switches 503a and 503b under the control of the control circuit 219. For example, because an induced voltage is generated in the coil 103 based on a high resonance frequency (e.g., 6.78 MHz), the source voltage of the first and second switches 503a and 503b may alternate according to the high frequency (e.g., 6.78 MHz). As the gate voltage $V_{gate}$ using the common source voltage $V_{source}$ as a reference voltage is applied to the gate of each of the first and second switches 503a and 503b, the on/off state of the first and second switches 503a and 503b may be controlled stably. Applying the gate voltage $V_{gate}$ or applying (or outputting) a driving signal may indicate applying a voltage exceeding a threshold voltage of each of the gates of the first and second switches 503a and 503b to the gate. Not applying the gate voltage $V_{gate}$ or not applying (or outputting) the driving signal may indicate applying a voltage not exceeding the threshold voltage of each of the gates of the first and second switches 503a and 503b to the gate. According to various embodiments, while the gate voltage $V_{gate}$ is applied to the gate of each of the first and second switches 503a and 503b, the first and second switches 503a and 503b may be controlled to the on state, and the coil 103 may be electrically connected to the capacitor 107 through the first and second switches 503a and 503b in the on state. For example, an electrical connection path may be established between the coil 103 and the capacitor 107 via the on-state first switch 503a and the second diode 505b or the first diode 505a and the on-state second switch 503b, and the coil current $I_{coil}$ may flow to the capacitor 107 through the electrical connection path. According to various embodiments, while the gate voltage $V_{gate}$ is not applied to either of the gates of the first and second switches 503a and 503b, the first and second switches 503a and 503b may be controlled to the off state, the electrical connection path between the coil 103 and the capacitor 107 through the first and second switches 503a and 503b may be disconnected, and the coil current $I_{coil}$ may not flow to the capacitor 107 and a rectifier (not shown) (e.g., the rectifier 209 of FIG. 2a) through the first and second switches 503a and 503b.

According to various embodiments, the second OVP circuit 205 may include two or more TVS diodes (e.g., a first TVS diode 507a and a second TVS diode 507b). According to various embodiments, the first TVS diode 507a and the second TVS diode 507b may be disposed in opposite directions and connected to each other in series.

According to various embodiments, the first and second TVS diodes 507a and 507b may be connected in parallel to the first and second switches 507a and 507b. According to various embodiments, the first and second TVS diodes 507a and 507b and the first and second switches 507a and 507b may be disposed between the coil 103 and the capacitor 107. According to various embodiments, the electronic device 101 may perform the second OVP operation for protecting the first OVP circuit 203, using the first and second TVS diodes 507a and 507b to prevent or reduce the chance of a voltage across the first OVP circuit 203 from exceeding a predetermined voltage, which will be described in more detail with reference to the later-described drawings.

Referring to FIG. 5b, the second OVP circuit 205 may include a third diode $D_{d1}$ 509a, a fourth diode $D_{d2}$ 509b, and/or a capacitor $C_E$ 511. According to various embodiments, as a voltage of a predetermined magnitude or larger is applied to both ends of the first and second switches 503a and 503b upon switching of the first and second switches 503a and 503b from the on state to the off state, the third and fourth diodes 509a and 509b may operate to rectify the induced voltage Vino so that the rectified voltage is applied as a voltage $V_{CE}$ across the capacitor 511. According to embodiments, the capacitor 511 may be charged according to a voltage rectified by the third and fourth diodes 509a and 509b. According to various embodiments, the capacitor 511 may be connected to the first end 503c of the first and second switches 503a and 503b, and the source voltage $V_{source}$ of the first and second switches 503a and 503b may be applied to one end of the capacitor 511. According to various embodiments, the electronic device 101 may perform the second OVP operation by using the capacitor $C_E$ 511, which will be described in more detail with reference to the later-described drawings. According to various embodiments, the second OVP circuit 205 may further include at least one resistor (not shown) connected in parallel to the capacitor 511. According to various embodiments, after the capacitor 511 is charged according to the voltage rectified by the third and fourth diodes 509a and 509b or a voltage spike generated across the first and second switches 503a and 503b, the charged energy may be discharged through the at least one resistor connected in parallel to the capacitor 511.

Referring to FIG. 5c, the electronic device 101 may include a coil $L_f$ 513. According to various embodiments, the coil 513 may be a coil having a smaller inductance than the coil 103. According to various embodiments, the coil 103 may be referred to as a receiver (RX) resonant coil that forms parallel resonance with the capacitor 107, and the coil 513 may be referred to as an RX auxiliary coil or feeding coil connected to the capacitor 109 and the rectifier (not shown) (e.g., the rectifier 209 of FIG. 2a). According to various embodiments, the coil 103 and the coil 513 may be magnetically connected, thus generating mutual inductance $M_f$ between them. According to various embodiments, due to the mutual inductance $M_f$, a voltage greater than the induced voltage $V_{ind}$ induced to the coil 103 by the Q factor of the resonance circuit may be induced to the coil 513. Current may flow through the rectifier (not shown) (e.g., the rectifier 209 of FIG. 2a) due to the voltage induced to the coil 513.

According to various embodiments, the first OVP circuit 203 and the second OVP circuit 205 may be disposed between the coil 103 and the capacitor 107 connected in parallel to each other. According to various embodiments, the first OVP circuit 203 may include the bi-directional switch 503 described before with reference to FIG. 5a or 5b. According to various embodiments, the second OVP circuit 205 may include two or more TVS diodes (e.g., the first and second TVS diodes 507a and 507b) described with reference to FIG. 5a, or the third diode Din 509a, the fourth diode Da, 509b, and/or the capacitor CE 511 described with reference to FIG. 5b.

While not shown, the first OVP circuit 203 of FIGS. 5a, 5b, and 5c may include at least one SSR. The electronic device 101 may control the first OVP circuit 203 to the off state by applying a signal obtained by inverting a first signal $V_{control}$ to be described later by an inverter (e.g., an inverter 703 of FIG. 7). For example, when the rectified voltage 401 increases above the first threshold voltage $V_{h\_max}$, the electronic device 101 may output the first signal $V_{control}$ so that the first OVP circuit 203 is in the off state, and when the rectified voltage decreases below (or to or below) the second threshold voltage $V_{h\_min}$, the electronic device 101 may discontinue outputting the first signal $V_{control}$ so that the first OVP circuit 203 is in the off state. For example, while the first signal $V_{control}$ is output, no current may flow in the LED of the at least one SSR, thereby turning off the at least one SSR. For example, while the first signal $V_{control}$ is not output, current may flow in the LED of the at least one SSR, thereby turning on the at least one SSR. As described above, the electronic device 101 may control the on/off state of the first OVP circuit 203 by determining whether to output the first signal $V_{control}$. Even in this case, when the at least one SSR is switched to the off state, the second OVP operation of the second OVP circuit 205 may be performed so that a voltage across the at least one SSR does not exceed a predetermined voltage.

Figure 6:
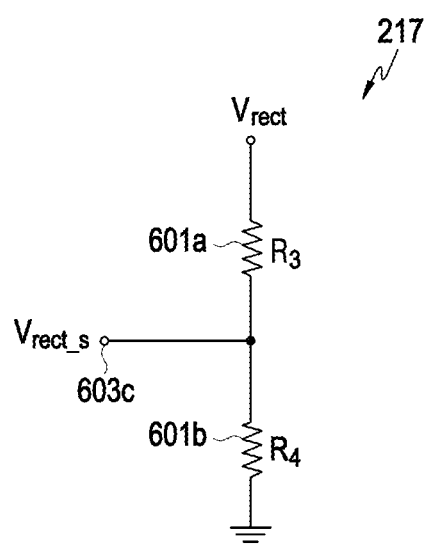
FIG. 6 illustrates an exemplary sensing circuit according to various example embodiments.

FIG. 6 illustrates an example of the sensing circuit 217 according to various embodiments.

According to various embodiments, the sensing circuit 217 may include a voltage divider including two or more resistors. For example, the sensing circuit 217 may include a resistor 601a having a resistance value $R_3$, and a resistor 601b having a resistance value $R_4$.

According to various embodiments, the sensing circuit 217 may be connected in parallel to the rectifier (not shown) (e.g., the rectifier 209 of FIG. 2a), and have one end 603c connected to the control circuit (not shown) (e.g., the control circuit 219 of FIG. 2a). According to various embodiments, a rectified voltage (e.g., the rectified voltage $V_{rect}$ of FIG. 2a) may be applied to both ends 603a and 603b of the sensing circuit 217. According to various embodiments, a voltage $V_{rect\_s}$ (e.g., the voltage $V_{rect\_s}$ corresponding to the rectified voltage of FIG. 2a) smaller than the rectified voltage $V_{rect}$ may be transmitted to the control circuit (not shown) connected to the one end 603c by the resistors 601a and 601b of the sensing circuit 217. For example, the voltage $V_{rect\_s}$ may have a magnitude obtained by multiplying the rectified voltage $V_{rect}$ by $R_4/(R_3+R_4)$. According to various embodiments, the control circuit (not shown) may control the first OVP operation by hysteresis control based on the voltage $V_{rect\_s}$ corresponding to the rectified voltage $V_{rect}$, which will be described in more detail with reference to the later-described drawings. According to various embodiments, the control circuit (not shown) may control the first OVP operation by comparing the rectified voltage $V_{rect}$ with the first threshold voltage (e.g., the first threshold voltage $V_{h\_max}$ of FIG. 4) and/or the second threshold voltage (e.g., the second threshold voltage $V_{h\_min}$ of FIG. 4).

Figure 7:
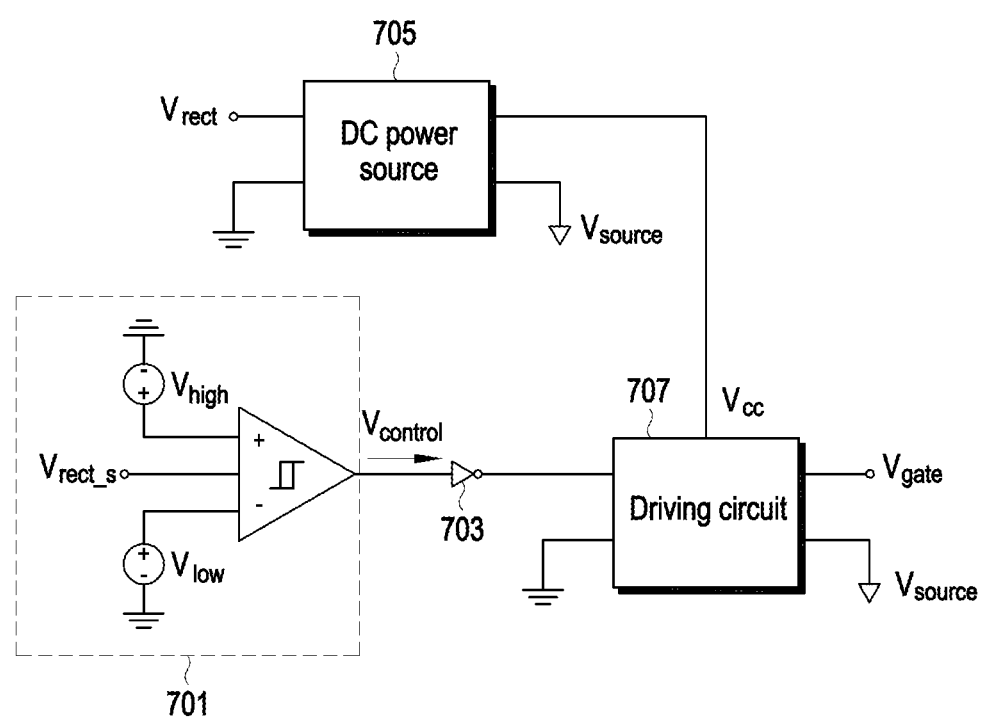
FIG. 7 is an exemplary diagram illustrating a method of controlling a first OVP circuit by a control circuit according to various example embodiments.

FIG. 7 is an exemplary diagram illustrating a method of controlling a first OVP circuit (e.g., the first OVP circuit 203 of FIG. 2a) by a control circuit (e.g., the control circuit 219 of FIG. 2a) according to various embodiments.

Referring to FIG. 7, the electronic device 101 may include a comparator 701, an inverter 703, a DC power source 705, and a driving circuit 707. According to various embodiments, the control circuit 219 may include the comparator 701. According to various embodiments, the inverter 703 may be included in the control circuit 219 or located outside the control circuit 219.

According to various embodiments, the comparator 701 may have a first threshold $V_{high}$ and/or a second threshold $V_{low}$. According to various embodiments, the first threshold $V_{high}$ may be set based on a first threshold voltage (e.g., the first threshold voltage $V_{h\_max}$ of FIG. 4), for example, to a value obtained by multiplying the first threshold voltage (e.g., $V_{h\_max}$) by a magnitude (e.g., $R_4/(R_3+R_4)$) of a voltage $V_{rect\_s}$ relative to that of a rectified voltage (e.g., the rectified voltage $V_{rect}$ of FIG. 2a). According to various embodiments, the second threshold $V_{low}$ may be set based on a second threshold voltage (e.g., the second threshold voltage $V_{h\_low}$ of FIG. 4), for example, to a value obtained by multiplying the second threshold voltage (e.g., $V_{h\_low}$) by the magnitude (e.g., $R_4/(R_3+R_4)$) of the voltage $V_{rect\_s}$ relative to that of the rectified voltage (e.g., the rectified voltage $V_{rect}$ of FIG. 2a).

According to various embodiments, the comparator 701 may perform an operation having a hysteresis characteristic based on the first threshold $V_{high}$ and/or the second threshold $V_{low}$. For example, the comparator 701 may compare the voltage $V_{rect\_s}$ received from the sensing circuit (not shown) (e.g., the sensing circuit 217 of FIG. 2a) with each of the first threshold $V_{high}$ and/or the second voltage $V_{low}$. For example, when the voltage $V_{rect\_s}$ is equal to or greater than (or exceeds) the first threshold $V_{high}$, the comparator 701 may output the first signal $V_{control}$ (e.g., a voltage of 1V). The comparator 701 may continue to output the first signal until the voltage $V_{rect\_s}$ decreases below (or to or below) the second threshold $V_{low}$. When the voltage $V_{rect\_s}$ is less than (or equal to or less than) the second threshold $V_{low}$, The comparator 701 may stop outputting the first signal. Then, when the voltage $V_{rect\_s}$ increases to or above (or above) the first threshold $V_{high}$, the comparator 701 may output the first signal again and repeat the above-described operation. Outputting (or applying) the first signal may be applying a voltage equal to or greater than a predetermined voltage (e.g., 1V) as $V_{control}$. Stopping the output of the first signal may be applying a voltage less than the predetermined voltage (e.g., 1V) as $V_{control}$. For example, the predetermined voltage (e.g., 1V) may be a voltage having a magnitude that causes the driving circuit 707 to operate.

According to various embodiments, the first signal output from the comparator 701 may be inverted through the inverter 703 and applied to the driving circuit 707. For example, when the first signal is output by the comparator 701, the first signal may be inverted through the inverter 703, and a voltage (e.g., 0V) less than the predetermined voltage may be applied to the driving circuit 707. For example, when the first signal is not output by the comparator 701, a voltage greater than or equal to the predetermined voltage (e.g., 1V) may be applied to the driving circuit 707.

According to various embodiments, the driving circuit 707 may have one end grounded, operate using a DC voltage $V_{CC}$ received from, directly or indirectly, the DC power source 705, and output a driving signal to the first OVP circuit (not shown) (e.g., the first OVP circuit 203 of FIG. 2a). For example, the driving signal may be a signal using a source voltage (e.g., the voltage $V_{source}$ at the first end 503c of FIG. 5a or 5b) of the first OVP circuit (e.g., the first OVP circuit 203 of FIG. 2a) as a reference voltage. According to various embodiments, the driving circuit 707 may output the driving signal to the first OVP circuit (not shown) (e.g., the first OVP circuit 203 of FIG. 2a) based on the magnitude of the voltage received from, directly or indirectly, the inverter 703. For example, when a voltage greater than or equal to the predetermined voltage (e.g., 1V) is received from the inverter 703, the driving circuit 707 may output the driving signal. For example, when a voltage (e.g., 0V) less than the predetermined voltage is received from, directly or indirectly, the inverter 703, the driving circuit 707 may not output the driving signal. According to various embodiments, the output driving signal may be applied as the gate voltage $V_{gate}$ to the first and second switches (not shown) (e.g., the first and second switches 503a and 503b of FIG. 5a or 5b) of the first OVP circuit (e.g., the first OVP circuit 203 of FIG. 2a), with the source voltage $V_{source}$ used as a reference voltage. Referring to FIGS. 2a, 5a and 5b, the driving circuit 707 may be referred to as an isolated gate driver because the driving circuit 707 outputs the driving signal (e.g., the gate voltage $V_{gate}$) based on the voltage $V_{source}$ at the front end (e.g., the first end 503c) of the rectifier 209 in response to the first signal output based on a voltage (e.g., the rectified voltage $V_{rect}$) at the rear end (e.g., output terminal) of the rectifier (e.g., the rectifier 209 of FIG. 2a) or the voltage $V_{rect\_s}$ corresponding to the voltage. According to various embodiments, when the first and second switches (e.g., the first and second switches 503a and 503b of FIG. 5A or 5B) are implemented as depletion MOSFETs, the inverter 703 may be omitted. For example, a depletion MOSFET may have the characteristic that when a gate voltage is equal to or less than a threshold voltage, drain current flows, and when the gate voltage exceeds the threshold voltage, the drain current decreases. When the first signal output through the comparator 701 is applied to the driving circuit 707 without passing through the inverter 703, and thus the first signal is output, the driving circuit 707 may output the driving signal to transition the first and second switches (e.g., the first and second switches 503a and 503b of FIG. 5a or 5b) to the off state, whereas when the first signal is not output, the driving circuit 707 may stop outputting the driving signal to transition the first and second switches (e.g., the first and second switches 503a and 503b of FIG. 5a or 5b) to the on state.

According to various embodiments, the DC power source 705 may apply the DC voltage $V_{CC}$ to the driving circuit 707. For example, the DC voltage $V_{CC}$ may be a DC voltage using the source voltage (e.g., the voltage $V_{source}$ at the first end 503c of FIG. 5a or 5b) of the first OVP circuit (e.g., the first OVP circuit 203 of FIG. 2a) as a reference voltage. According to various embodiments, the DC power source 705 may have one end grounded, and the other end connected to the output terminal of the rectifier (not shown) (e.g., the rectifier 209 of FIG. 2a). According to various embodiments, the DC power source 705 may operate using the rectified voltage $V_{rect}$. According to various embodiments, the DC power source 705 may operate according to a voltage other than the rectified voltage $V_{rect}$. In this case, the DC power source 705 may not be connected to the output terminal of the rectifier 209. Referring to FIGS. 2a, 5a and 5b, the DC power source 705 may be referred to as an isolated DC power source because the DC power source 705 supplies the DC voltage $V_{CC}$ based on the voltage $V_{source}$ at the front end (e.g., the first end 503c) of the rectifier, operating with the voltage (e.g., the rectified voltage $V_{rect}$) at the rear end (e.g., output terminal) of the rectifier 209.

According to various embodiments, it may be described that the comparator 701 and the driving circuit 707 form the control circuit (e.g., the control circuit 219 of FIG. 2a). In this case, it may be described that the control circuit (e.g., the control circuit 219 of FIG. 2a) outputs the driving signal (e.g., the gate voltage $V_{gate}$).

Figure 8:
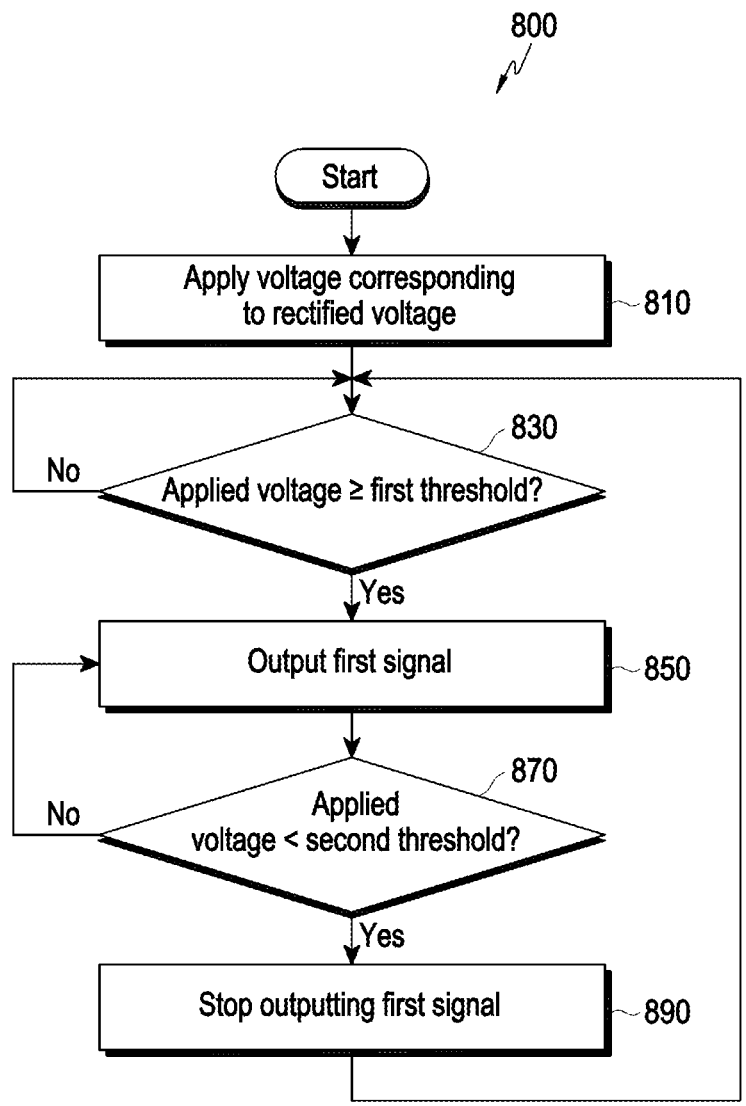
FIG. 8 is a flowchart illustrating an operation having a hysteresis characteristic in a comparator according to various example embodiments.

FIG. 8 is a flowchart 800 illustrating an operation having a hysteresis characteristic in a comparator (e.g., the comparator 701 of FIG. 7) according to various embodiments. The following description will be given with reference to FIG. 7 together.

According to various embodiments, the electronic device (e.g., the electronic device 101 of FIG. 2a) may apply a voltage corresponding to a rectified voltage (e.g., the rectified voltage $V_{rect}$ of FIG. 2a) in operation 810. For example, the voltage $V_{rect\_s}$ corresponding to the rectified voltage (e.g., the rectified voltage $V_{rect}$ of FIG. 2a) may be applied from a sensing circuit (e.g., the sensing circuit 217 of FIG. 2a) to an input terminal of the comparator 701.

According to various embodiments, in operation 830, the electronic device 101 may determine whether the applied voltage $V_{rect\_s}$ is equal to or greater than the first threshold $V_{high}$. For example, the electronic device 101 may identify whether the applied voltage $V_{rect\_s}$ is equal to or greater than the first threshold (e.g., $V_{high}$ of FIG. 7) by comparing the applied voltage $V_{rect\_s}$ with the first threshold $V_{high}$ using the comparator 701. According to various embodiments, when the applied voltage $V_{rect\_s}$ is not equal to or greater than the first threshold $V_{high}$ (e.g., when the applied voltage $V_{rect\_s}$ is less than the first threshold $V_{high}$), the electronic device 101 may perform operation 830 again.

According to various embodiments, when the applied voltage $V_{rect\_s}$ is equal to or greater than the first threshold $V_{high}$, the electronic device 101 may output a first signal (e.g., the first signal of FIG. 7) in operation 850. For example, when the applied voltage $V_{rect\_s}$ is equal to or greater than the first threshold (e.g., $V_{high}$ in FIG. 7), the electronic device 101 may output the first signal (e.g., the first signal of FIG. 7) using the comparator.

According to various embodiments, the electronic device 101 may determine whether the applied voltage $V_{rect\_s}$ is less than the second threshold $V_{low}$ in operation 870. For example, the electronic device 101 may determine whether the applied voltage $V_{rect\_s}$ is less than the second threshold (e.g., $V_{low}$ of FIG. 7) by comparing the applied voltage $V_{rect\_s}$ with the second threshold $V_{low}$ using the comparator 701. According to various embodiments, according to the output of the first signal (e.g., the first signal of FIG. 7), the first OVP circuit (e.g., the first OVP circuit 203 of FIG. 2a) may be switched to the off state, and the rectified voltage (e.g., the rectified voltage $V_{rect}$ of FIG. 2a) may gradually decrease. According to various embodiments, as the rectified voltage (e.g., the rectified voltage $V_{rect}$ of FIG. 2a) gradually decreases, the applied voltage $V_{rect\_s}$ may also decrease correspondingly. According to various embodiments, the electronic device 101 may continue operation 850 until the applied voltage $V_{rect\_s}$ decreases below the second threshold (e.g., $V_{low}$ in FIG. 7).

According to various embodiments, when the applied voltage $V_{rect\_s}$ decreases below the second threshold $V_{low}$, the electronic device 101 may stop outputting the first signal (e.g., the first signal of FIG. 7) in operation 890. According to various embodiments, as the output of the first signal (e.g., the first signal of FIG. 7) is stopped, the first OVP circuit (e.g., the first OVP circuit 203 of FIG. 2a) may be switched to the on state, and the rectified voltage (e.g., the rectified voltage $V_{rect}$ of FIG. 2a) may gradually increase. According to various embodiments, as the rectified voltage (e.g., the rectified voltage $V_{rect}$ of FIG. 2a) gradually increases, the applied voltage $V_{rect\_s}$ may also increase correspondingly.

According to various embodiments, when identifying that the applied voltage $V_{rect\_s}$ increases to or above the first threshold (e.g., $V_{high}$ in FIG. 7) in operation 830, the electronic device 101 may perform operation 850 and the subsequent operations again.

Unlike the above description, the electronic device 101 may compare the rectified voltage (e.g., the rectified voltage $V_{rect}$ of FIG. 2a) with the first threshold voltage (e.g., the first threshold voltage $V_{h\_max}$ of FIG. 4) and/or the second threshold voltage (e.g., the second threshold voltage $V_{h\_min}$ of FIG. 4) using the comparator 701. According to various embodiments, when the rectified voltage (e.g., the rectified voltage $V_{rect}$ of FIG. 2a) increases to or above the first threshold voltage (e.g., the first threshold voltage $V_{h\_max}$ of FIG. 4) as a result of the comparison, the electronic device 101 may output the first signal using the comparator 701. When the rectified voltage (e.g., the rectified voltage $V_{rect}$ of FIG. 2a) decreases below the first threshold voltage (e.g., the first threshold voltage $V_{h\_max}$ of FIG. 4), the electronic device 101 may stop the output of the first signal until the rectified voltage (e.g., the rectified voltage $V_{rect}$ of FIG. 2a) decreases below the second threshold voltage (e.g., the second threshold voltage $V_{h\_min}$ of FIG. 4). When the rectified voltage (e.g., the rectified voltage $V_{rect}$ of FIG. 2a) decreases below the second threshold voltage (e.g., the second threshold voltage $V_{h\_min}$ of FIG. 4), the electronic device 101 may output the first signal until the rectified voltage (e.g., the rectified voltage $V_{rect}$ of FIG. 2a) increases to or above the first threshold voltage (e.g., the first threshold voltage $V_{h\_max}$ of FIG. 4), using the comparator 701.

Figure 9:
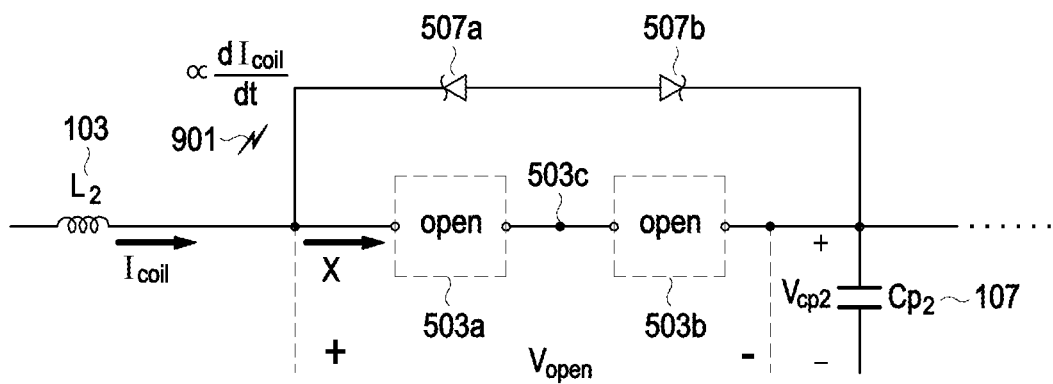
FIG. 9 is an exemplary diagram illustrating a second OVP operation of an electronic device, according to various example embodiments.

FIG. 9 is an exemplary diagram illustrating a second OVP operation of an electronic device (e.g., the electronic device 101 of FIG. 2a) according to various embodiments. FIG. 9 will be described with reference to FIG. 5a together.

According to various embodiments, as the first switch 503a and the second switch 503b are switched to the off state based on the rectified voltage (e.g., the rectified voltage $V_{rect}$ of FIG. 2a) increased to or above the first threshold voltage (e.g., the first threshold voltage $V_{h\_max}$ of FIG. 4), the connection between the first switch 503a and the second switch 503b may be opened.

According to various embodiments, as the first switch 503a and the second switch 503b are switched to the off state, the parallel connection between the coil 103 and the capacitor 107 may be disconnected. According to various embodiments, in the absence of the first and second TVS diodes 507a and 507b, as the parallel connection between the coil 103 and the capacitor 107 is disconnected (e.g., as inductive load switching occurs), the flow of the coil current $I_{coil}$ may change rapidly. Accordingly, a voltage spike 901 (e.g., surge voltage) with a magnitude proportional to $$\frac{dt_{coil}}{dt}$$

may occur at both ends of the first and second switches 503a and 503b.

According to various embodiments, the first TVS diode 507a and the second TVS diode 507b may have a high-impedance characteristic when the voltage at both ends is low, and a low-impedance characteristic when the voltage at both ends is high.

According to various embodiments, when a voltage of a predetermined magnitude (e.g., $V_{BR}$ (e.g., minimum breakdown voltage)) or larger is applied as a voltage $V_{open}$ across the first and second switches 503a and 503b due to the voltage spike 901 having a magnitude proportional to $$\frac{dt_{coil}}{dt},$$

the first TVS diode 507a and the second TVS diode 507b are switched to the low-impedance characteristic, and the voltage applied to both ends of the first and second TVS diodes 507a and 507b may be limited (e.g., clamped) to or below a maximum or high clamping voltage (e.g., $V_C$) For example, when a reverse biased voltage of the predetermined magnitude (e.g., $V_{BR}$) or larger is applied to both ends of the first TVS diode 507a due to a change in the flow of the coil current $I_{coil}$ flowing in a reverse direction with respect to the first TVS diode 507a, the voltage applied to both ends of the first TVS diode 507a may be limited (e.g., clamped) to or below the maximum clamping voltage (e.g., $V_C$) of the first TVS diode 507a by the first TVS diode 507a. For example, when a reverse biased voltage of the predetermined magnitude (e.g., $V_{BR}$) or larger is applied to both ends of the second TVS diode 507b due to a change in the flow of the coil current $I_{coil}$ flowing in a reverse direction with respect to the second TVS diode 507b, the voltage applied to both ends of the second TVS diode 507b may be limited (e.g., clamped) to or below the maximum clamping voltage (e.g., $V_C$) of the second TVS diode 507b by the second TVS diode 507b. Therefore, because the voltage across the first OVP circuit (e.g., the first and second switches 503a and 503b) connected in parallel to the first and second TVS diodes 507a and 507b is also limited, the first OVP circuit (e.g., the first and second switches 503a and 503b) may be protected from an overvoltage (e.g., the voltage spike 901). Subsequently, the voltage spike 901 may be stopped, and the first TVS diode 507a and the second TVS diode 507b may be switched from the low-impedance characteristic to the high-impedance characteristic again.

According to various embodiments, the first and second TVS diodes 507a and 507b may allow the coil current $I_{coil}$ to flow through the first TVS diode 507a and the second TVS diode 507b, based on the voltage of the predetermined magnitude (e.g., $V_{BR}$) or larger being applied to both ends of the first and second switches 503a and 503b due to the voltage spike 901 having the magnitude proportional to $$\frac{dt_{coil}}{dt}.$$

According to various embodiments, when the coil current $I_{coil}$ flows through the first TVS diode 507a and the second TVS diode 507b, the coil current $I_{coil}$ may be limited to or below a certain magnitude (e.g., $I_{PP}$) according to the reverse bias characteristics of the first TVS diode 507a and the second TVS diode 507b. For example, when a reverse bias voltage of the predetermined magnitude (e.g., $V_{BR}$) or larger is applied to both ends of the first TVS diode 507a, the coil current $I_{coil}$ may be limited to or below the certain magnitude (e.g., $I_{PP}$) according to the reverse bias characteristics of the first TVS diode 507a. For example, when the reverse bias voltage of the predetermined magnitude (e.g., $V_{BR}$) or larger is applied to both ends of the second TVS diode 507b, the coil current $I_{coil}$ may be limited to or below the certain magnitude (e.g., $I_{PP}$) according to the reverse bias characteristics of the second TVS diode 507b. Subsequently, the voltage spike 901 may be stopped, and the first TVS diode 507a and the second TVS diode 507b may be switched back from the low-impedance characteristic to the high-impedance characteristic. The coil current $I_{coil}$ does not flow through the first and second TVS diodes 507a and 507b, and even if an induced voltage is induced to the coil 103, the coil current $I_{coil}$ may not be output from the coil 103.

According to various embodiments, TVS diodes having a small current capacity and size may be available as the first and second TVS diodes 507a and 507b. For example, since current flowing to the first and second TVS diodes 507a and 507b is limited by the impedance (e.g., Thevenin equivalent impedance) of the coil 103, the first and second TVS diodes 507a and 507b may be implemented with TVS diodes having a small current capacity and size (e.g., 1005 size).

According to various embodiments, the voltage across each of the first and second switches 503a and 503b is limited to a relatively small extent, compared to a voltage $V_{CP2}$ across a parallel resonant capacitor (e.g., the capacitor 107). Accordingly, the sizes and/or cost of the first and second switches 503a and 503b may be reduced.

Figure 10:
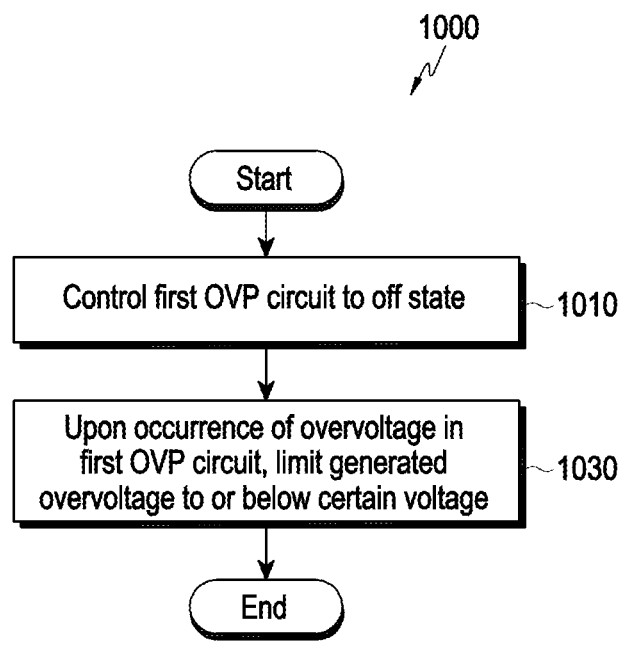
FIG. 10 is a flowchart illustrating a second OVP operation of an electronic device according to various example embodiments.

FIG. 10 is a flowchart 1000 illustrating a second OVP operation of an electronic device (e.g., the electronic device 101 of FIG. 2a) according to various embodiments.

According to various embodiments, the electronic device 101 may control the first OVP circuit (e.g., the first OVP circuit 203 of FIG. 2a) to the off state in operation 1010. For example, based on a rectified voltage (e.g., the rectified voltage $V_{rect}$ of FIG. 2a) increased to or above the first threshold voltage (e.g., the first threshold voltage $V_{h\_max}$ of FIG. 4), the electronic device 101 may stop outputting a driving signal to the first OVP circuit 203, and thus the first OVP circuit 203 may be switched to the off state.

According to various embodiments, upon occurrence of an overvoltage in the first OVP circuit 203, the electronic device 101 may limit the overvoltage to or below a certain voltage in operation 1030. For example, as the first OVP circuit 203 is switched from the on state to the off state, an overvoltage (e.g., the voltage spike 901 of FIG. 9) may occur in the first OVP circuit 203. The electronic device 101 may perform the second OVP operation using the second OVP circuit 205 connected in parallel to the first OVP circuit 203, in which the overvoltage (e.g., the voltage spike 901 of FIG. 9) is limited to or below a certain voltage (e.g., the maximum clamping voltage $V_C$ of the first and second TVS diodes (e.g., the first and second TVS diodes 507a and 507b of FIG. 9)). The electronic device 101 may protect the first OVP circuit 203 from the overvoltage (e.g., the voltage spike 901 of FIG. 9) by performing the second OVP operation.

Figure 11A:
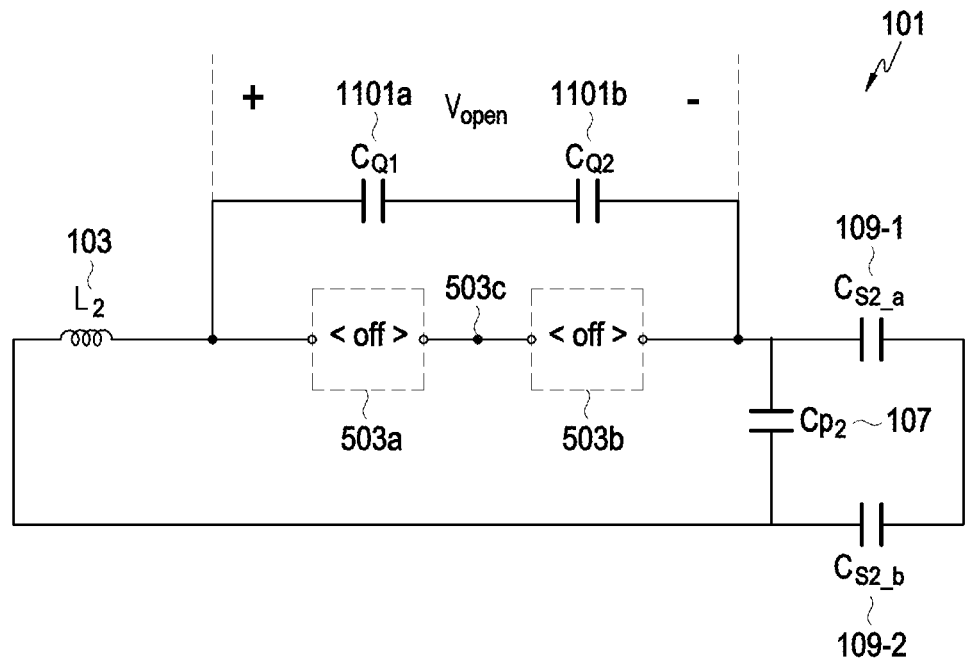
FIG. 11a is a diagram illustrating an equivalent circuit viewed from the perspective of a rectifier in an electronic device according to various example embodiments.
Figure 11B:
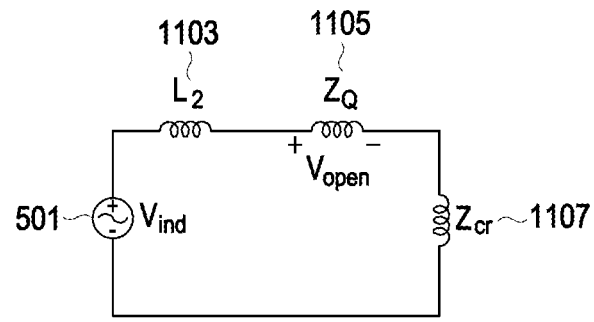
FIG. 11b is a diagram illustrating a Thevenin equivalent circuit viewed from the perspective of a rectifier in an electronic device according to various example embodiments.

FIG. 11a is a diagram illustrating an equivalent circuit viewed from the perspective of a rectifier (e.g., the rectifier 209 of FIG. 2a) of the electronic device 101, according to various embodiments. FIG. 11b illustrates a Thevenin equivalent circuit viewed from the perspective of the rectifier (e.g., the rectifier 209 of FIG. 2a) of the electronic device 101 according to various embodiments.

Referring to FIG. 11a, an equivalent circuit viewed from the perspective of the rectifier (e.g., the rectifier 209 in FIG. 2a (e.g., viewed from the input terminal of rectifier 209)) when the bi-directional switch (e.g., the first switch 503a and the second switch 503b) of the first OVP circuit (e.g., the first OVP circuit 203 of FIG. 2a) is switched to the off state is illustrated. A capacitor (e.g., the capacitor 109 of FIG. 1B) is shown separately as two capacitors having the same capacitance, a capacitor $C_{S2\_a}$ 109-1 and a capacitor $C_{S2\_b}$ 109-2. For example, the capacitor $C_{S2\_a}$ 109-1 and the capacitor $C_{S2\_b}$ 109-2 may have the same capacitance $C_{S2}$. Because the bi-directional switch (e.g., the first switch 503a and the second switch 503b) of the first OVP circuit (e.g., the first OVP circuit 203 of FIG. 2a) is in the off state, it may be said that the capacitor $C_{S2\_a}$ 109-1 and the capacitor $C_{S2\_b}$ 109-2 are equivalently shorted from the rectifier (e.g., the rectifier of FIG. 2a). According to various embodiments, a capacitor $C_{Q1}$ 1101a is a parasitic capacitor of the first switch 503a, and a capacitor $C_{Q2}$ 1101b may be a parasitic capacitor of the second switch 503b.

Referring to FIG. 11b, the Thevenin equivalent circuit of FIG. 11a is shown. According to various embodiments, the equivalent circuit of FIG. 11a may be interpreted as including an induced voltage $V_{ind}$ 501, a Thevenin equivalent impedance 1103 having an impedance $Z_{L2}$, a Thevenin equivalent impedance 1105 having an impedance $Z_Q$, and a Thevenin equivalent impedance 1107 having an impedance $Z_{cr}$. For example, the Thevenin equivalent impedance 1103 may correspond to the coil 103, the Thevenin equivalent impedance 1105 may correspond to the capacitor 1101a and the capacitor 1101b connected in series, and the Thevenin equivalent impedance 1107 may correspond to the capacitor 107, the capacitor 109-1, and the capacitor 109-2.

According to various embodiments, the voltage $V_{open}$ across the bidirectional switch (e.g., the first switch 503a and the second switch 503b) in the off state may be calculated by Equation 1 to Equation 4.

$$Z_{L2} = jwL_2 \quad \text{[Equation 1]}$$

$$Z_{cr} = \frac{1}{jw\left(C_{p2} + \frac{C_{s2}}{2}\right)} \quad \text{[Equation 2]}$$

$$Z_Q = \frac{2}{jwC_{Q1}} \quad \text{[Equation 3]}$$

$$V_{open} = \frac{V_{ind}}{\frac{Z_{L2} + Z_{cr}}{Z_Q} + 1} \quad \text{[Equation 4]}$$

In Equation 1, $Z_{L2}$ may represent the Thevenin equivalent impedance of the coil 103, j may represent a unit imaginary number, and w may represent a resonance frequency. In Equation 2, $Z_{Cr}$ may represent the Thevenin equivalent impedance of the capacitor 107, the capacitor 109-1, and the capacitor 109-2, $C_{P2}$ may represent the capacitance of the capacitor 107, and $C_{S2}$ may represent the capacitance of each of the capacitor 109-1 and the capacitor 109-2. In Equation 3, $V_{open}$ may represent the voltage across the bi-directional switch (e.g., the first switch 503a and the second switch 503b) in the off state, and $V_{ind}$ may represent the magnitude of the induced voltage $V_{ind}$ 501. Because impedance matching on the side of the electronic device 101 is generally close to a resonance point (e.g., the resonance frequency), $Z_{L2}+Z_{cr}$ in Equation 4 is a small value relative to $Z_Q$, and thus $V_{open}$ may be mathematically approximated by Equation 5.

$$V_{open} \approx V_{ind}(Z_Q >> Z_{L2}+Z_{Cr}) \quad \text{[Equation 5]}$$

Referring to Equation 5, when or after the bi-directional switch (e.g., the first switch 503a and the second switch 503b) of the first OVP circuit (e.g., the first OVP circuit 203 of FIG. 2a) is switched to the off state, most of the induced voltage 501 may be applied to both ends of the bidirectional switch (e.g., the first switch 503a and the second switch 503b) of the first OVP circuit (e.g., the first OVP circuit 203 of FIG. 2a). According to various embodiments, when or after the bi-directional switch (e.g., the first switch 503a and the second switch 503b) of the first OVP circuit (e.g., the first OVP circuit 203 of FIG. 2a) is switched to the off state, the electronic device 101 may generate and store energy for outputting a driving signal (e.g., the driving signal of FIG. 7) using the voltage applied to both ends of the bidirectional switch (e.g., the first switch 503a and the second switch 503b) of the first OVP circuit (e.g., the first OVP circuit 203 of FIG. 2a), which will be described in more detail with reference to the later-described drawings.

Figure 12A:
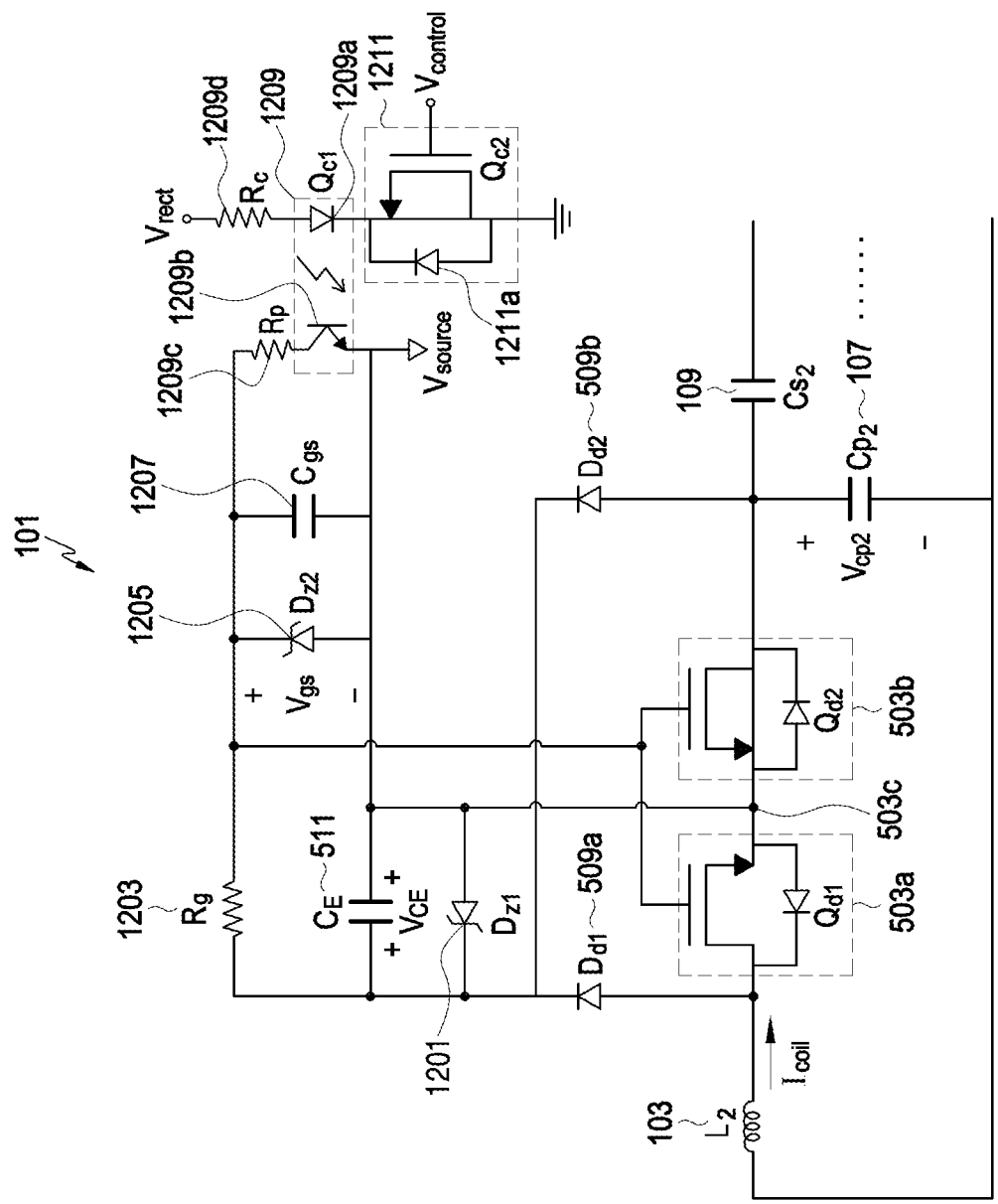
FIG. 12a is an exemplary diagram illustrating an energy harvesting circuit that generates energy to output a driving signal in an electronic device 101 according to various example embodiments.

FIG. 12a is an exemplary diagram illustrating an energy harvesting circuit that generates energy for outputting a driving signal (e.g., the driving signal of FIG. 7) in the electronic device 101 according to various embodiments. The following description will be given with reference to FIG. 5b together.

According to various embodiments, the electronic device 101 may include a first OVP circuit (e.g., the first OVP circuit 203 of FIG. 2a) including the first switch $Q_{d1}$ 503a and the second switch $Q_{d2}$ 503b, and a second OVP circuit (e.g., the second OVP circuit 205 of FIG. 2a) including the third diode Dai 509a, the fourth diode $D_{d2}$ 509b, and the capacitor $C_E$ 511.

According to various embodiments, the second OVP circuit (e.g., the second OVP circuit 205 of FIG. 2a) including the third diode $D_{d1}$ 509a, the fourth diode $D_{d2}$ 509b, and the capacitor $C_E$ 511 may form an energy harvesting circuit that charges the capacitor 511 with the voltage $V_{CE}$.

Referring to FIG. 12a, the energy harvesting circuit of the electronic device 101 may further include a Zener diode $D_{z1}$ 1201 connected in parallel to the capacitor 511. According to various embodiments, the Zener diode 1201 may regulate a rectified voltage YE applied to the capacitor 511 to or below a certain voltage (e.g., a Zener breakdown voltage of the Zener diode 1201). According to various embodiments, a resistor $R_g$ 1203 may be a gate resistor of the first switch 503a and the second switch 503b, and a capacitor $C_{gs}$ 1207 may be a gate-source capacitor of the first switch 503a and the second switch 503b. According to various embodiments, the energy harvesting circuit of the electronic device 101 may further include a Zener diode $D_{z2}$ 1205 connected in parallel to the gate and source of the first switch 503a and/or the gate and source of the second switch 503b. According to various embodiments, the Zener diode 1205 may regulate a voltage $V_{gs}$ applied to the capacitor 1207 to or below a certain voltage (e.g., a Zener breakdown voltage of the Zener diode 1205). According to various embodiments, each of the Zener diode 1201 or the Zener diode 1205 may be replaced with a TVS diode, and the voltage $V_{CE}$ or the voltage $V_{gs}$ may be limited to or below the certain voltage through the TVS diode.

In FIG. 12a, $V_{source}$, which is the common source voltage of the first switch 503a and the second switch 503b, may be a voltage at the first end 503c. $V_{CP2}$ may be a voltage across the capacitor $C_{P2}$ 107.

According to various embodiments, the electronic device 101 may include an opto-coupler $Q_{c1}$ 1209 and a switch $Q_{c2}$ 1211. For example, the switch 1211 may be an N-channel MOSFET connected in series to the opto-coupler 1209, and as far as it is capable of switching to an on state or an off state by an applied voltage $V_{control}$, any switch element is available as the switch 1211. A diode 1211a may be a body diode of the switch 1211. According to various embodiments, the opto-coupler 1209 may include an LED 1209a and a photodiode 1209b. According to various embodiments, a resistor $R_p$ 1209c may be an internal resistor of the photodiode 1209b. According to various embodiments, a resistor $R_C$ 1209d may be an internal resistor of the LED 1209a of the opto-coupler 1209. According to various embodiments, the opto-coupler 1209 may operate based on the voltage $V_{control}$ applied to the switch 1211. For example, when the magnitude of the voltage $V_{control}$ applied to the switch 1211 exceeds a threshold voltage of the switch 1211, the switch 1211 may be switched to the on state, so that the LED 1209a may be connected to the ground through the switch 1211. As the LED 1209a is connected to the ground through the switch 1211, the LED 1209a may be switched to the on state based on a voltage (e.g., the rectified voltage $V_{rec}$t) and radiate light. When the light radiated from the LED 1209a arrives, the photodiode 1209b may be switched to the on state. As the photodiode 1209b is switched to the on state, a connection path may be formed between the resistor 1209c and the sources of the first switch 503a and the second switch 503b. For example, when the magnitude of the voltage $V_{control}$ applied to the switch 1211 does not exceed the threshold voltage of the switch 1211, the switch 1211 may be switched to the off state, so that the LED 1209a may be turned off and thus may not radiate light. When light radiated from the LED 1209a does not arrive, the photodiode 1209b may be switched to the off state. As the photodiode 1209b is switched to the off state, the connection between the resistor 1209c and the sources of the first switch 503a and the second switch 503b may be disconnected, and as the capacitor 1207 is charged with energy stored in the capacitor 511, a driving signal (e.g., the driving signal of FIG. 7) may be generated, which will be described in more detail with reference to the later-described drawings. The above-described voltage (e.g., the rectified voltage $V_{rec}$t) for the operation of the LED 1209a is exemplary, and a voltage other than the rectified voltage $V_{rect}$ from an external power source may be applied to the LED 1209a. According to various embodiments, since application of the driving signal (e.g., the driving signal of FIG. 7) is determined by the opto-coupler 1209 according to the voltage $V_{control}$ applied to the switch 1211, the opto-coupler 1209 and the switch 1211 may be interpreted as serving as a driving circuit (e.g., the driving circuit 707 of FIG. 7).

Figure 12B:
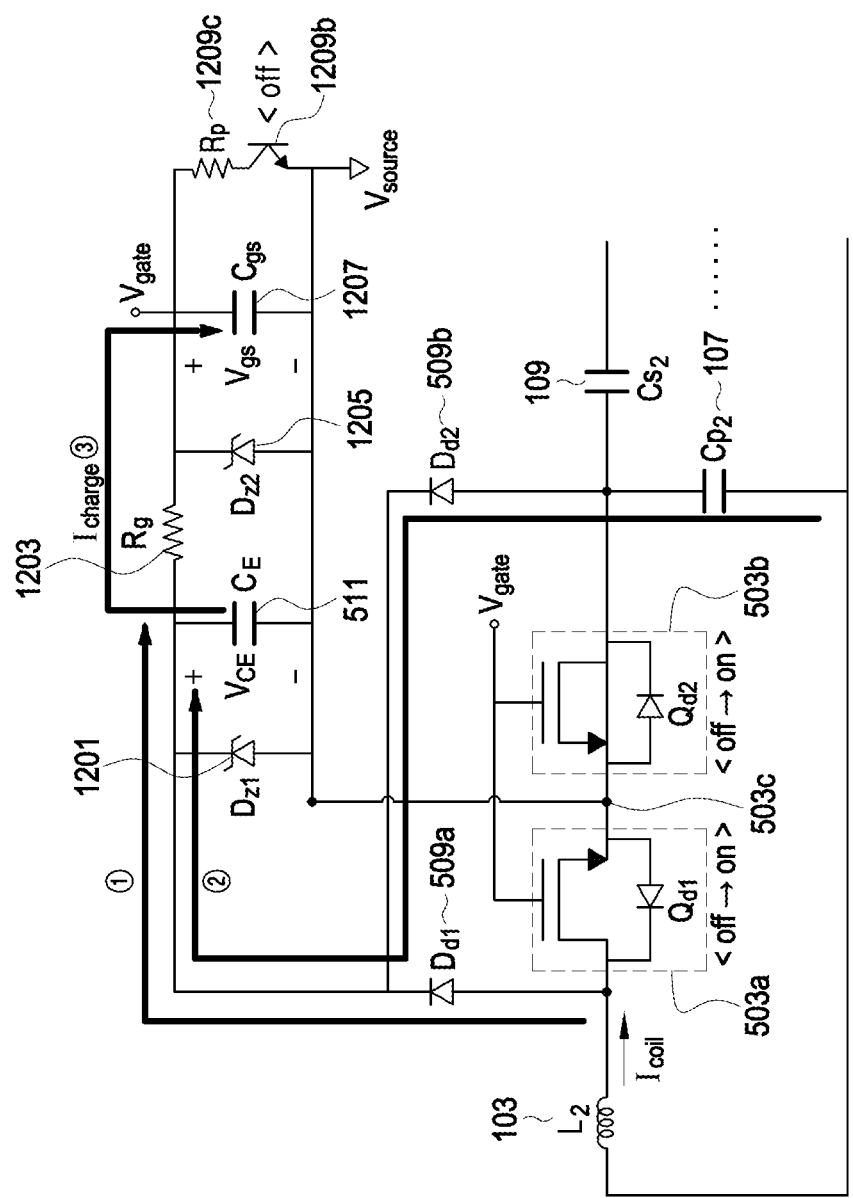
FIG. 12b is an exemplary diagram illustrating an energy harvesting operation, when an electronic device enters a chargeable area according to various example embodiments.

FIG. 12b is an exemplary diagram illustrating an energy harvesting operation when the electronic device 101 enters a chargeable area (e.g., the chargeable area 4 of FIG. 1a) according to various embodiments. The energy harvesting operation will be described with reference to FIGS. 5b, 11a and 12a together.

According to various embodiments, the electronic device 101 may enter the chargeable area (e.g., the chargeable area 4 of FIG. 1a). According to various embodiments, before the electronic device 101 enters the chargeable area (e.g., the chargeable area 4 of FIG. 1a), the photodiode 1209b of the electronic device 101 may be in the off state. For example, as a rectified voltage (e.g., the rectified voltage $V_{rec}$t of FIG. 2a) of the electronic device 101 is less than the second threshold voltage (e.g., the second threshold voltage $V_{h\_min}$ of FIG. 4), the photodiode 1209b of the electronic device 101 may be in the off state. According to various embodiments, the first and second switches 503a and 503b of the electronic device 101 may be in the off state.

According to various embodiments, as the electronic device 101 is located in the chargeable area (e.g., the chargeable area 4 of FIG. 1a), the induced voltage Vino may be formed in the coil 103 by a wireless power transmitter (e.g., the wireless power transmitter 1 of FIG. 1a). According to various embodiments, the electronic device 101 may charge the capacitor 511 with the induced voltage Vim). For example, the coil current $I_{coil}$ may be output from the coil 103 according to the formation of the induced voltage $V_{ind}$, and the output coil current $I_{coil}$ may flow in a path ① or a path ②. Referring to Equation 5 together, most of the induced voltage $V_{ind}$ may be applied to both ends of the first and second switches 503a and 503b. The voltage applied to both ends of the first and second switches 503a and 503b may be rectified by the third and fourth diodes 509a and 509b, the capacitor 511 may be charged based on the coil current $I_{coil}$ flowing in the path ① or a path ②, a voltage $V_{CE}$ with a magnitude equal to that of the rectified voltage may be applied to both ends of the capacitor 511, and energy may be stored in the capacitor 511. According to various embodiments, the capacitor 1207 may be charged based on the energy stored in the capacitor 511. For example, the capacitor 511 may be gradually discharged so that charging current $I_{charge}$ output from the capacitor 511 flows through a path ③, the capacitor 1207 is charged based on the charging current $I_{charge}$, and the voltage $V_{gs}$ across the capacitor 1207 may gradually increase. According to various embodiments, while the voltage $V_{gs}$ across the capacitor 1207 is gradually increasing, the voltage $V_{CE}$ of the capacitor 511 may gradually decrease, and thus the voltage $V_{gs}$ across the capacitor 1207 may be equal to the voltage $V_{CE}$ across the capacitor 511. According to various embodiments, the voltage $V_{gs}$ across the capacitor 1207 may be applied as the driving signal $V_{gate}$ of the first and second switches 503a and 503b, using the source voltage $V_{source}$ as a reference voltage. According to various embodiments, as the voltage $V_{gs}$ across the capacitor 1207 gradually increases and exceeds threshold voltages of the first and second switches 503a and 503b along with the charging of the capacitor 1207, the first and second switches 503a and 503b may be switched to the on state. According to various embodiments, while the first and second switches 503a and 503b are in the on state, the voltage $V_{gs}$ across the capacitor 1207 may not decrease. For example, because leakage current (e.g., leakage current through the photodiode 1209b in the off state) through the opto-coupler (e.g., the opto-coupler 1209 in FIG. 12a) and/or leakage current through the Zener diode 1205 (e.g., reverse current through the Zener diode 1205) is small (e.g., less than 1 μA), the voltage $V_{gs}$ across the capacitor 1207 may be maintained greater than the threshold voltages of the first and second switches 503a and 503b. For example, the voltage $V_{gs}$ across the capacitor 1207 may be maintained greater than the threshold voltages of the first and second switches 503a and 503b until the photodiode 1209b is switched to the on state. Accordingly, the on-states of the first and second switches 503a and 503b may be maintained until the photodiode 1209b is switched to the on state. According to various embodiments, although the aforementioned leakage current is of a small amount, the voltage $V_{CE}$ across the capacitor 511 may gradually decrease due to the leakage current. The electronic device 101 may periodically change the on/off states of the first and second switches 503a and 503b and the opto-coupler (e.g., the opto-coupler 1209 of FIG. 12a) such that the voltage $V_{CE}$ across the capacitor 511 is maintained at a certain predetermined level or higher. For example, the electronic device 101 may periodically switch the opto-coupler (e.g., the opto-coupler 1209 of FIG. 12a) to the on state, and thus further charge the capacitor 511 and/or the capacitor 1207 using the induced voltage $V_{ind}$ and/or a voltage spike (e.g., the voltage spike 901 of FIG. 9). For example, to control the opto-coupler (e.g., the opto-coupler 1209 of FIG. 12a), the electronic device 101 may include, in addition to the comparator that outputs the first signal, an element (e.g., an MCU) that periodically outputs a second signal and a logic device (e.g., OR gate) to which the first signal and the second signal are applied. Therefore, even though the first signal is not output from the comparator, when the second signal is applied to the logic device (e.g., the OR gate), the electronic device 101 may switch the switch 1211 to the on state. For example, the second signal may be output with a period $T_h$ and a pulse width $W_h$, where the period $T_h$ may be set to be shorter than a time constant (e.g., $R_{GC\_E}$) of the capacitor 511, and the pulse width $W_h$ may be set to be longer than a transition time during which the first and second switches 503a and 503b are switched from the on state to the off state. Each embodiment herein may be used in combination with any other embodiment described herein.

According to various embodiments, as the first and second switches 503a and 503b are switched to the on state, the coil 103 may be connected to the capacitor 107 in parallel. According to various embodiments, the coil current $I_{coil}$ output from the coil 103 may flow to the capacitor 107 through the first and second switches 503a and 503b, and the rectified voltage (e.g., the rectification $V_{rect}$ of FIG. 2a) may gradually increase. For example, referring to FIG. 4 together, as the first and second switches 503a and 503b are switched to the on state, the rectified voltage 401 may gradually increase until time. According to various embodiments, in the case where the capacitor 511 is set to have a capacitance greater than that of the capacitor 1207, when the first and second switches 503a and 503b are switched from the off state to the on state, the change of the voltage $V_{CE}$ at both ends of the capacitor 511 may not be large. For example, when the capacitor 511 is set to have a capacitance 10 times larger than the capacitance of the capacitor 1207, a comparison of the voltage $V_{CE}$ across the capacitor 511 between before and after the first and second switches 503a and 503b are switched to the on state may reveal a change of about 10%.

According to various embodiments, the capacitor 511 may be set to have a capacitance higher than that of the capacitor 1207, so that the capacitor 511 may be charged faster than the capacitor 1207. According to various embodiments, since the capacitor 511 is charged faster than the capacitor 1207, the capacitor 511 may be fully charged based on the coil current $I_{coil}$ flowing in the path ① or the path ② before the voltage $V_{gs}$ across the capacitor 1207 exceeds the threshold voltages of the first and second switches 503a and 503b (e.g., before the first and second switches 503a and 503b are switched to the on state).

According to various embodiments, the resistor $R_g$ 1203 may determine the charging rate of the capacitor 1207 and/or a speed at which the first switch (e.g., the first switch 503a of FIG. 5a) and the second switch (e.g., the second switch 503b of FIG. 5b) are switched to the on state. For example, the time constant $T_{gs}$ of the capacitor 1207 may be calculated according to Equation 6.

$$\tau_{gs} = R_g C_{gs} \qquad \text{[Equation 6]}$$

Referring to Equation 6, since the time constant $T_{gs}$ of the capacitor 1207 is proportional to the size of the resistor 1203, and the rate at which the capacitor 1207 is charged by the energy output from the capacitor 511 may be inversely proportional to the size of the resistor 1203. Since a time until the voltage across the capacitor 1207 exceeds the threshold voltage of each of the first switch 503a and the second switch 503b is proportional to the time constant $\tau_{gs}$, the speed at which the first and second switches are switched to the on state may be inversely proportional to the size of the resistor 1203.

Figure 12C:
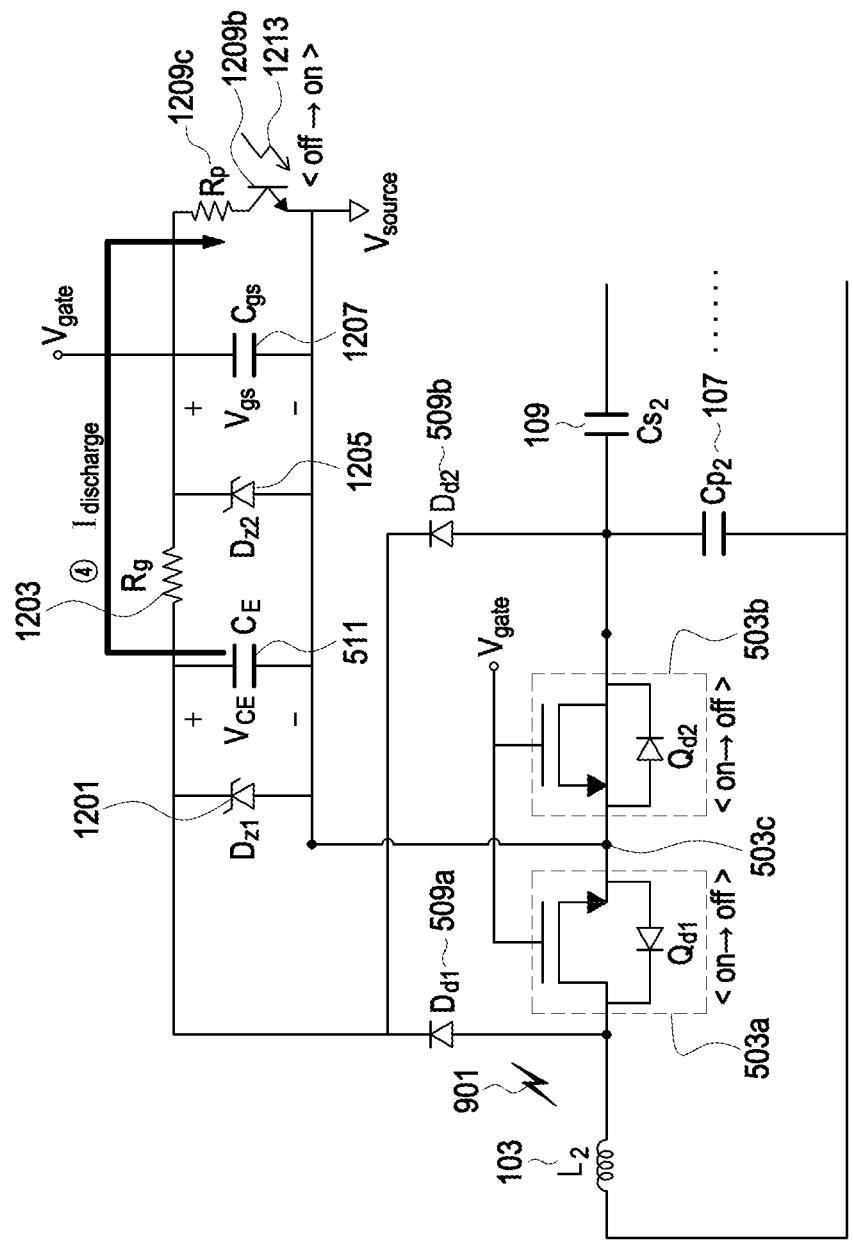
FIG. 12c is an exemplary diagram illustrating a second OVP operation and an energy harvesting operation of an electronic device, when the electronic device performs a first OVP operation according to various example embodiments.

FIG. 12c is an exemplary diagram illustrating a second OVP operation and an energy harvesting operation of the electronic device 101, when the electronic device 101 performs a first OVP operation according to various embodiments. The operations will be described with reference to FIGS. 5b, 11a, 12a, and 12b together.

According to various embodiments, the electronic device 101 may switch the photodiode 1209b to the on state. For example, while the first and second switches 503a and 503b of the electronic device 101 are in the on state, a rectified voltage (e.g., the rectified voltage $V_{rect}$ of FIG. 2a) may gradually increase. When the rectified voltage (e.g., the rectified voltage $V_{rect}$ of FIG. 2a) gradually increases to or above the first threshold voltage (e.g., the first threshold voltage $V_{h\_max}$ of FIG. 4), the electronic device 101 may control a switch (e.g., the switch 1211 of FIG. 12a) to the on state. As the switch (e.g., the switch 1211 in FIG. 12a) is controlled to the on state, light 1213 radiated from an LED (e.g., the LED 1209a of FIG. 12a) may reach the photodiode 1209b, thereby switching the photodiode 1209b to the on state. According to various embodiments, since the photodiode 1209b has a smaller Thevenin equivalent impedance than the capacitor 1207 during the on state, the voltage $V_{gs}$ across the capacitor 1207 may decrease to or below the threshold voltages of the first and second switches 503a and 503b according to the switching of the photodiode 1209b to the on state. As the voltage $V_{gs}$ across the capacitor 1207 decreases to or below the threshold voltages of the first and second switches 503a and 503b, the first and second switches 503a and 503b may be switched to the off state. According to various embodiments, when the first and second switches 503a and 503b are switched to the off state, the voltage spike 901 may occur at both ends of the first and second switches 503a and 503b. According to various embodiments, the electronic device 101 may perform the second OVP operation using the capacitor 511. For example, the capacitor 511 may be set to have a high capacitance (e.g., 10 nF) for use as an energy buffer, and as the first switch (e.g., the first switch 503a in FIG. 5b) and the second switch (e.g., the second switch 503b of FIG. 5b) are switched from the on state to the off state, the generated voltage spike 901 may be limited to or below a certain voltage by the capacitor 511. For example, the voltage spike 901 may be limited to or below the certain voltage by Equation 7.

$$V_{E\,peak} < \sqrt{\frac{L_2}{C_E}} \cdot I_{coil}|t = t_{d1} \qquad \text{[Equation 7]}$$

In Equation 7, $V_{E-peak}$ may represents a maximum or high voltage value of the voltage spike 901, $L_2$ may represent the inductance of the coil 103, CE may represent the capacitance of the capacitor 511, $I_{coil}$ may present the magnitude of the coil current $I_{coil}$ at time $t_{d1}$, and $t_{d2}$ may be a time when the first switch (e.g., the first switch 503a in FIG. 5b) and the second switch (e.g., the second switch 503b in FIG. 5b) are switched to the off state.

According to various embodiments, the capacitor 511 may be charged based on the generated voltage spike 901. For example, as the first and second switches 503a and 503b are switched to the off state, the coil current $I_{coil}$ output from the coil 103 may flow in the path ① or the path ④ (e.g., the path ① or the path ② of FIG. 12b). As the capacitor 511 is charged based on the coil current $I_{coil}$ flowing in the path ① or the path $\sqrt{2}$, a voltage with a magnitude by which the voltage spike 901 is limited to or below the certain voltage may be applied as the voltage $V_{CE}$ at both ends of the capacitor 511, and energy may be stored in the capacitor 511. According to various embodiments, since the photodiode 1209b should have a smaller Thevenin equivalent impedance than the capacitor 1207 during the on state, the capacitor 511 may be gradually discharged, a discharge current $I_{discharge}$ output from the capacitor 511 may flow through a path ④ while the photodiode 1209b is in the on state, and the capacitor 1207 may not be charged.

According to various embodiments, while the first and second switches 503a and 503b are in the off state, the coil 103 may not be connected in parallel to the capacitor 107 through the first and second switches 503a and 503b. According to various embodiments, as parallel connection is not established between the coil 103 and the capacitor 107, the rectified voltage (e.g., the rectified voltage $V_{rect}$ of FIG. 2a) may gradually decrease. For example, referring to FIG. 4 together, as the first and second switches 503a and 503b are switched to the off state at time to, the rectified voltage 401 may gradually decrease until time $t_1$. According to various embodiments, the induced voltage $V_{ind}$ may be generated in the coil 103 even while the first and second switches 503a and 503b are in the off state, and as described with reference to FIG. 12a, the electronic device 101 may charge the capacitor 511 based on the generated induced voltage $V_{ind}$. Since the induced voltage $V_{ind}$ generated in the coil 103 is an AC voltage, the induced voltage $V_{ind}$ has a sinusoidal waveform, and its magnitude may periodically change in the sinusoidal waveform. While the magnitude of the induced voltage $V_{ind}$ is greater than the magnitude of the voltage $V_{CE}$ across the capacitor 511, the charging current $I_{charge}$ may be limited to or below the coil current $I_{coil}$ due to the influence of the inductance $L_2$ of the coil 103. Accordingly, a rectifier diode having a current specification equal to (or higher than) the magnitude of the coil current $I_{coil}$ may be available as the third and fourth diodes 509a and 509b.

According to various embodiments, when the rectified voltage (e.g., the rectified voltage $V_{rect}$ of FIG. 2a) gradually decreases below the second threshold voltage (e.g., the second threshold voltage $V_{h\_min}$ of FIG. 4), the electronic device 101 may control the switch (e.g., the switch 1211 of FIG. 12a) to the off state. As the switch (e.g., the switch 1211 of FIG. 12a) is controlled to the off state, the charging current $I_{charge}$ output from the capacitor 511 may flow through the path ③, the capacitor 1207 may be charged based on the charging current $I_{charge}$, and the voltage $V_{gs}$ across the capacitor 1207 may gradually increase until it exceeds the threshold voltages of the first and second switches 503a and 503b, as described in FIG. 12b. As the voltage $V_{gs}$ across the capacitor 1207 exceeds the threshold voltages of the first and second switches 503a and 503b, the first and second switches 503a and 503b may be switched back to the on state.

Figure 13:
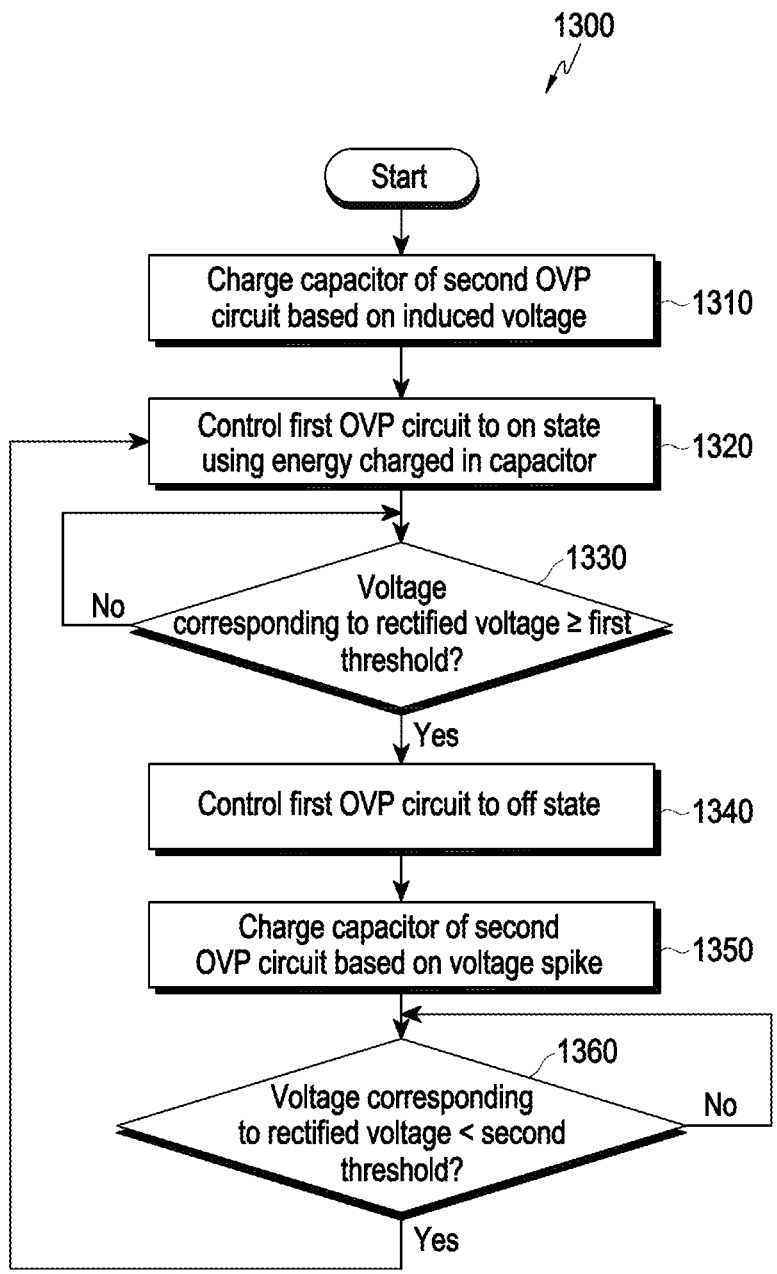
FIG. 13 is a flowchart illustrating a method of performing an energy harvesting operation through an operation having a hysteresis characteristic by an electronic device according to various example embodiments.

FIG. 13 is a flowchart 1300 illustrating a method of performing an energy harvesting operation through an operation having a hysteresis characteristic in an electronic device (e.g., the electronic device 101 of FIG. 2a) according to various embodiments. The method will be described with reference to FIGS. 12a, 12b and 12c together.

According to various embodiments, the electronic device 101 may charge the second OVP circuit (e.g., the second OVP of FIG. 2a) based on the induced voltage $V_{ind}$ (e.g., the induced voltage $V_{ind}$ of FIG. 12a) in operation 1310. For example, the electronic device 101 may charge the capacitor 511 using the coil current $I_{coil}$ output from the coil (e.g., the coil 103 of FIG. 12a) according to the generation of the induced voltage $V_{ind}$.

According to various embodiments, in operation 1320, the electronic device 101 may control the first OVP circuit (e.g., the second OVP circuit 203 of FIG. 2a) to the on state using energy charged in the capacitor 511. For example, the electronic device 101 may charge a capacitor (e.g., the capacitor 1207 of FIG. 12a) using the charging current $I_{charge}$ output from the capacitor 511. As the capacitor 1207 is charged, the voltage $V_{gs}$ across the capacitor 1207 may exceed threshold voltages of first and second switches (e.g., the first and second switches 503a and 503b in FIG. 5a) of the first OVP circuit 203. The voltage $V_{gs}$ across the capacitor 1207 exceeding the threshold voltages of the first and second switches 503a and 503b may be applied as the driving signal $V_{gate}$ of the first and second switches 503a and 503b, with the source voltage $V_{source}$ as a reference voltage. As the driving signal $V_{gate}$ exceeding the threshold voltage of the first and second switches 503a and 503b is applied to the first and second switches 503a and 503b, the first and second switches 503a and 503b of the first OVP circuit 203 may be switched to the on state.

According to various embodiments, in operation 1330, the electronic device 101 may identify whether a voltage (e.g., the voltage $V_{rect\_s}$ of FIG. 6) corresponding to a rectified voltage (e.g., the rectified voltage $V_{rect}$ of FIG. 2a) is equal to or greater than the first threshold $V_{high}$. For example, the electronic device 101 may compare the applied voltage $V_{rect\_s}$ with the first threshold $V_{high}$ using the comparator (e.g., the comparator 701 of FIG. 7), to identify whether the applied voltage $V_{rect\_s}$ is equal to or greater than the first threshold $V_{high}$. According to various embodiments, when the applied voltage $V_{rect\_s}$ is not equal to or greater than the first threshold $V_{high}$ (e.g., when the applied voltage $V_{rect\_s}$ is less than the first threshold $V_{high}$), operation 1330 may be performed again.

According to various embodiments, when the applied voltage $V_{rect\_s}$ is equal to or greater than the first threshold $V_{high}$, the electronic device 101 may control the first OVP circuit 203 to the off state in operation 1340. For example, when the applied voltage $V_{rect\_s}$ is equal to or greater than the first threshold $V_{high}$, the electronic device 101 may apply the voltage $V_{control}$ exceeding the threshold voltage of the switch 1211 to the switch 1211. As the voltage $V_{control}$ exceeding the threshold voltage of the switch 1211 to the switch 1211, the LED 1209a may be switched to the on state. The voltage $V_{gs}$ across the capacitor 1207 may decrease to or below the threshold voltages of the first and second switches 503a and 503b by light which is radiated as the LED 1209a is turned on. As the voltage $V_{gs}$ across the capacitor 1207 decreases to or below the threshold voltages of the first and second switches 503a and 503b, the first and second switches 503a and 503b may be switched to the off state.

According to various embodiments, in operation 1350, the electronic device 101 may charge the capacitor 511 of the second OVP circuit 205 based on a voltage spike (e.g., the voltage spike 901 of FIG. 9). For example, as the capacitor 511 is charged based on the coil current $I_{coil}$, a voltage with a magnitude by which the voltage spike 901 is limited to or below a certain voltage may be applied as the voltage $V_{CE}$ across the capacitor 511, and energy may be stored in the capacitor 511. According to various embodiments, when the voltage spike 901 occurs, the electronic device 101 may also perform the second OVP operation using the capacitor 511.

According to various embodiments, the electronic device 101 may identify whether the voltage $V_{rect\_s}$ corresponding to the rectified voltage $V_{rec}t$ is less than the second threshold $V_{low}$ in operation 1360. For example, the electronic device 101 may compare the applied voltage $V_{rect\_s}$ with the second threshold $V_{low}$ using the comparator 701, to identify whether the voltage $V_{rect\_s}$ corresponding to the rectified voltage $V_{rec}t$ is less than the second threshold $V_{low}$. According to various embodiments, when the voltage $V_{rect\_s}$ corresponding to the rectified voltage $V_{rec}t$ is less than the second threshold $V_{low}$, the electronic device 101 may perform operation 1360 again. According to various embodiments, when the voltage $V_{rect\_s}$ corresponding to the rectified voltage $V_{rec}t$ is less than the second threshold $V_{low}$, the electronic device 101 may not apply the voltage $V_{control}$ exceeding the threshold voltage of the switch 1211 to the switch 1211. When the voltage $V_{control}$ exceeding the threshold voltage of the switch 1211 is not applied to the switch 1211, the switch 1211 may be switched to the off state, so that the LED 1209a is switched to the off state and does not radiate light. Accordingly, the photodiode 1209b may be in the off state, and operation 1320 may be performed again.

According to various embodiments, an electronic device may include a battery, a resonance circuit including a coil and a capacitor and configured to receive power wirelessly, a rectifier configured to rectify AC power received from, directly or indirectly, the resonance circuit into DC power, a DC/DC converter configured to convert the DC power received from, directly or indirectly, the rectifier and output the converted power, a charger configured to charge the battery using the converted power received from the DC/DC converter, a first OVP circuit configured to selectively connect the coil, directly or indirectly, to the capacitor, a second OVP circuit connected in parallel to the first OVP circuit, a sensing circuit configured to sense the rectified voltage of the rectifier, a control circuit, and a communication circuit. The control circuit may be configured to control the first OVP circuit to an off state not to connect the coil to the capacitor, based on the sensed rectified voltage being equal to or greater than a first threshold voltage, and control to switch the first OVP circuit from the off state to an on state to connect the coil to the capacitor, based on the sensed rectified voltage being less than a second threshold voltage. The second threshold voltage is less than the first threshold voltage.

According to various embodiments, after the first OVP circuit is controlled to the off state based on the rectified voltage being equal to or greater than the first threshold voltage, the rectified voltage may decrease below the first threshold voltage and then gradually decrease to the second threshold voltage, and after the first OVP circuit is controlled to the on state based on the rectified voltage being less than the second threshold voltage, the rectified voltage may increase to or above the second threshold voltage and then gradually increase to the first threshold voltage.

According to various embodiments, the control circuit may include a hysteresis comparator, and the hysteresis comparator may be configured to output a first signal based on the rectified voltage being equal to or greater than the first threshold voltage, and stop outputting the first signal based on the rectified voltage being less than the second threshold voltage.

According to various embodiments, the electronic device may further include a driving circuit, and the driving circuit may be configured to output a driving signal to the first OVP circuit based on the first signal not being output, and stop outputting the driving signal based on the first signal being output, and wherein the first OVP circuit is configured to be controlled to the on state while the driving signal is applied.

According to various embodiments, the driving circuit may be configured to output the first signal by using a voltage at a first end to which a plurality of switches included in the first OVP circuit are connected as a reference voltage, and the voltage at the first end may be different from a reference voltage at an output terminal of the rectifier.

According to various embodiments, the first OVP circuit may include a bi-directional switch including a plurality of switches, and the plurality of switches may be connected in series to each other in opposite directions.

According to various embodiments, the plurality of switches may include a first MOSFET and a second MOSFET, a source of the first MOSFET and a source of the second MOSFET may be connected in series to each other, and a common gate voltage using a source voltage of the first MOSFET and a source voltage of the second MOSFET as a reference voltage may be applied as a driving signal to a gate of the first MOSFET and a gate of the second MOSFET.

According to various embodiments, the second OVP circuit may include a plurality of TVS diodes connected in series to each other in opposite directions, and when the first OVP circuit is switched to the off state, an overvoltage generated in the first OVP circuit may be limited to or below a certain voltage using the plurality of TVS diodes.

According to various embodiments, the second OVP circuit may include at least one capacitor configured to store energy according to a voltage across the first OVP circuit, based on the first OVP circuit being controlled to the off state.

According to various embodiments, the electronic device may include an opto-coupler, and the control circuit may be configured to control the opto-coupler to output the energy stored in the at least one capacitor, based on the sensed rectified voltage being less than the second threshold voltage.

According to various embodiments, a driving signal may be applied to the first OVP circuit based on the energy output from the at least one capacitor, and the first OVP circuit may be configured to be switched to the on-state based on the applied driving signal.

According to various embodiments, an electronic device may include a battery, a resonance circuit including a coil and a capacitor and configured to receive power wirelessly, a rectifier configured to rectify AC power received from, directly or indirectly, the resonance circuit into DC power, at least one conversion circuit configured to convert the DC power received from the rectifier, a bi-directional circuit configured to selectively connect the coil, directly or indirectly, to the capacitor, a control circuit, and a communication circuit. The control circuit may be configured to control the bi-directional switch to an off state not to connect the coil to the capacitor, based on the rectified voltage at an output terminal of the rectifier being equal to or greater than a first threshold voltage, and control the bi-directional switch to an on state to electrically connect the coil to the capacitor, based on the rectified voltage being less than a second threshold voltage. The second threshold voltage is less than the first threshold voltage.

According to various embodiments, based on the bi-directional switch being controlled to the off state, the rectified voltage may decrease below the first threshold voltage and then gradually decrease to the second threshold voltage, and based on the bi-directional switch being controlled to the on state, the rectified voltage may increase to or above the second threshold voltage and then gradually increase to the first threshold voltage.

According to various embodiments, the bi-directional switch may include a first MOSFET and a second MOSFET, and the first MOSFET and the second MOSFET may be connected in series to each other.

According to various embodiments, based on the rectified voltage being less than the second threshold voltage, voltages of a magnitude equal to or greater than a certain magnitude may be applied to a gate of the first MOSFET and a gate of the second MOSFET, and voltages of the same magnitude may be applied to the gate of the first MOSFET and the gate of the second MOSFET.

According to various embodiments, a gate voltage of the first MOSFET and a gate voltage of the second MOSFET may be maintained to be equal to or greater than a certain magnitude until before the rectified voltage reaches the first threshold voltage.

According to various embodiments, the electronic device may include a protection circuit connected to the bi-directional switch in parallel, and as the bi-directional switch is transitioned from an on state to an off state, a voltage across the protection circuit may increase and then decrease to or below a certain voltage.

According to various embodiments, as the bi-directional switch is transitioned from the on state to the off state, current may be applied to the protection circuit.

According to various embodiments, the protection circuit may include at least one TVS diode or at least one capacitor.

According to various embodiments, the coil and the capacitor may be configured to be connected to each other in parallel through the bi-directional switch.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a battery;
   a resonance circuit comprising a coil and a capacitor and configured to receive power wirelessly;
   a rectifier configured to rectify alternating current (AC) power received from the resonance circuit into direct current (DC) power;
   a DC/DC converter configured to convert the DC power received from the rectifier to converted power, and to output the converted power;
   a charger configured to charge the battery using the converted power received from the DC/DC converter;
   a first overvoltage protection (OVP) circuit configured to selectively connect the coil to the capacitor;
   a second OVP circuit connected in parallel to the first OVP circuit;
   a sensing circuit configured to sense a rectified voltage of the rectifier;
   a control circuit; and
   a communication circuit,
   wherein the control circuit is configured to:
      control the first OVP circuit to an off state not to connect the coil to the capacitor, based on the sensed rectified voltage being equal to or greater than a first threshold voltage, and
      control to switch the first OVP circuit from the off state to an on state to connect the coil to the capacitor, based on the sensed rectified voltage being less than a second threshold voltage, and
      wherein the second threshold voltage is less than the first threshold voltage.

2. The electronic device according to claim 1, wherein the control circuit is configured so that after the first OVP circuit is controlled to the off state based on the rectified voltage being equal to or greater than the first threshold voltage, the rectified voltage decreases below the first threshold voltage and then gradually decreases to the second threshold voltage, and after the first OVP circuit is controlled to the on state based on the rectified voltage being less than the second threshold voltage, the rectified voltage increases to or above the second threshold voltage and then gradually increases to the first threshold voltage.

3. The electronic device according to claim 1, wherein the control circuit comprises a hysteresis comparator, and
   wherein the hysteresis comparator is configured to:
      output a first signal based on the rectified voltage being equal to or greater than the first threshold voltage, and
      stop outputting the first signal based on the rectified voltage being less than the second threshold voltage.

4. The electronic device according to claim 3, further comprising a driving circuit,
   wherein the driving circuit is configured to:
      output a driving signal to the first OVP circuit based on the first signal not being output, and
      stop outputting the driving signal based on the first signal being output, and
   wherein the first OVP circuit is configured to be controlled to the on state while the driving signal is applied.

5. The electronic device according to claim 4, wherein the driving circuit is configured to output the first signal at least by using a voltage at a first end to which a plurality of switches included in the first OVP circuit are connected as a reference voltage, and
   wherein the voltage at the first end is different from a reference voltage at an output terminal of the rectifier.

6. The electronic device according to claim 1, wherein the first OVP circuit comprises a bi-directional switch including a plurality of switches, and
   wherein the plurality of switches are connected in series to each other in opposite directions.

7. The electronic device according to claim 6, wherein the plurality of switches include a first metal-oxide semiconductor field-effect transistor (MOSFET) and a second MOSFET, and
   wherein a source of the first MOSFET and a source of the second MOSFET are connected in series to each other, and the switches are configured so that a common gate voltage using a source voltage of the first MOSFET and a source voltage of the second MOSFET as a reference voltage is to be applied as a driving signal to a gate of the first MOSFET and a gate of the second MOSFET.

8. The electronic device according to claim 1, wherein the second OVP circuit comprises a plurality of transient voltage suppressor (TVS) diodes connected in series to each other in opposite directions, and
   wherein the first OVP circuit is configured so that when the first OVP circuit is switched to the off state, an overvoltage generated in the first OVP circuit is limited to or below a certain voltage using the plurality of TVS diodes.

9. The electronic device according to claim 1, wherein the second OVP circuit comprises at least one capacitor configured to store energy according to a voltage across the first OVP circuit, based on the first OVP circuit being controlled to the off state.

10. The electronic device according to claim 9, further comprising an opto-coupler,
    wherein the control circuit is configured to control the opto-coupler to output the energy stored in the at least one capacitor, based on the sensed rectified voltage being less than the second threshold voltage.

11. The electronic device according to claim 10, wherein a driving signal is to be applied to the first OVP circuit based on the energy output from the at least one capacitor, and
    wherein the first OVP circuit is configured to be switched to the on-state based on the applied driving signal.

12. A method of controlling an electronic device, comprising:
    sensing a rectified voltage of a rectifier;
    controlling a first overvoltage protection (OVP) circuit of the electronic device to an off state not to connect a coil of a resonance circuit of the electronic device to a capacitor of the resonance circuit, based on the sensed rectified voltage being equal to or greater than a first threshold voltage; and
    switching the first OVP circuit from the off state to an on state to connect the coil to the capacitor, based on the sensed rectified voltage being less than a second threshold voltage, wherein the second threshold voltage is less than the first threshold voltage.

13. The method according to claim 12, wherein after the first OVP circuit is controlled to the off state based on the rectified voltage being equal to or greater than the first threshold voltage, the rectified voltage decreases below the first threshold voltage and then gradually decreases to the second threshold voltage, and after the first OVP circuit is controlled to the on state based on the rectified voltage being less than the second threshold voltage, the rectified voltage increases to or above the second threshold voltage and then gradually increases to the first threshold voltage.

14. The method according to claim 12, further comprising:
   outputting a first signal based on the rectified voltage being equal to or greater than the first threshold voltage; and
   stopping outputting the first signal based on the rectified voltage being less than the second threshold voltage.

15. The method according to claim 14, further comprising:
   outputting a driving signal to the first OVP circuit based on the first signal not being output; and
   stopping outputting the driving signal based on the first signal being output,
   wherein the first OVP circuit is controlled to the on state while the driving signal is applied.

* * * * *